United States Patent
Lin et al.

(10) Patent No.: US 10,943,161 B2
(45) Date of Patent: Mar. 9, 2021

(54) OBJECT ON WHICH TWO-DIMENSIONAL CODE IS DISPOSED, AND TWO-DIMENSIONAL CODE GENERATION METHOD, IDENTIFICATION METHOD, GENERATION APPARATUS, AND IDENTIFICATION APPARATUS

(71) Applicant: TENCENT TECHNOLOGY (SHENZHEN) COMPANY LIMITED, Guangdong (CN)

(72) Inventors: Yu Geng Lin, Shenzhen (CN); Dian Ping Xu, Shenzhen (CN); Chen Ran, Shenzhen (CN); Hua Jie Huang, Shenzhen (CN); Yi Ke Liu, Shenzhen (CN); Zhang Jing Yang, Shenzhen (CN); Hong Yang Wang, Shenzhen (CN); Tao Zou, Shenzhen (CN); Hong Xiao Yu, Shenzhen (CN); Pin Lin Chen, Shenzhen (CN); Jun Jie Zhou, Shenzhen (CN); Ju Bo Mo, Shenzhen (CN); Ting Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 227 days.

(21) Appl. No.: 16/305,637

(22) PCT Filed: Aug. 16, 2017

(86) PCT No.: PCT/CN2017/097640
§ 371 (c)(1),
(2) Date: Nov. 29, 2018

(87) PCT Pub. No.: WO2018/033093
PCT Pub. Date: Feb. 22, 2018

(65) Prior Publication Data
US 2020/0334507 A1 Oct. 22, 2020

(30) Foreign Application Priority Data

Aug. 18, 2016 (CN) .......................... 201610688875.4

(51) Int. Cl.
*G06K 19/06* (2006.01)

(52) U.S. Cl.
CPC .................. *G06K 19/06037* (2013.01); *G06K 2019/06225* (2013.01)

(58) Field of Classification Search
None
See application file for complete search history.

(56) References Cited

U.S. PATENT DOCUMENTS

| 6,267,296 | B1 | 7/2001 | Ooshima et al. |
| 2014/0239072 | A1 | 8/2014 | Chang et al. |
| 2016/0341333 | A1* | 11/2016 | Podpaly .............. F16K 37/0058 |

FOREIGN PATENT DOCUMENTS

| CN | 101944187 A | 1/2011 |
| CN | 105550726 A | 5/2016 |

(Continued)

OTHER PUBLICATIONS

International Search Report of PCT/CN2017/097640 dated Nov. 27, 2017 [PCT/ISA/210].

(Continued)

*Primary Examiner* — Kristy A Haupt
(74) *Attorney, Agent, or Firm* — Sughrue Mion, PLLC

(57) ABSTRACT

A two-dimensional code, a two-dimensional code generation method, identification method, generation apparatus, and identification apparatus, and a storage medium are provided. The two-dimensional code includes a square module array including an array of m*m modules, a location detection pattern and a data information pattern. The location detection pattern determines a location of the two-dimensional code, the data information pattern is configured to carry data (Continued)

information, each module of the array of m*m modules is at least one of a first-type module and a second-type module, a color attribute of the first-type module is different from a color attribute of the second-type module, and m is at least one of 17, 18, 19, and 20.

17 Claims, 22 Drawing Sheets

(56) References Cited

FOREIGN PATENT DOCUMENTS

| | | |
|---|---|---|
| CN | 106372699 A | 2/2017 |
| WO | 2011/087030 A1 | 7/2011 |

OTHER PUBLICATIONS

Communication dated Jan. 12, 2021 from the European Patent Office in Application No. 17841065.0.

* cited by examiner

OBJECT ON WHICH TWO-DIMENSIONAL CODE IS DISPOSED, AND TWO-DIMENSIONAL CODE GENERATION METHOD, IDENTIFICATION METHOD, GENERATION APPARATUS, AND IDENTIFICATION APPARATUS

CROSS-REFERENCE TO RELATED PATENT APPLICATIONS

This application is a U.S. National Stage application under 35 U.S.C. § 371 of International Application No. PCT/CN2017/097640, filed on Aug. 16, 2017, which claims priority to Chinese Patent Application No. 201610688875.4, filed with the Chinese Patent Office on Aug. 18, 2016 and entitled "OBJECT ON WHICH TWO-DIMENSIONAL CODE IS DISPOSED, AND TWO-DIMENSIONAL CODE GENERATION METHOD, IDENTIFICATION METHOD, GENERATION APPARATUS, AND IDENTIFICATION APPARATUS", the disclosures of which are incorporated by reference herein in their entirety.

BACKGROUND

1. Field

This application relates generally to the field of information processing technologies, and more specifically relates to an object on which a two-dimensional code is disposed, a two-dimensional code generation method, identification method, generation apparatus, and identification apparatus, and a computer readable storage medium.

2. Description of Related Art

With continuous development of information processing technologies, two-dimensional codes are widely used as they have wide encoding ranges and are strong in fault tolerance capability and simple to use. A quick response (QR) two-dimensional code is one type of two-dimensional code. The QR two-dimensional code includes a square module array formed by multiple square modules arranged in n rows by n columns. Each of the modules is a minimal identification unit.

Currently, there are 40 versions of two-dimensional codes, which are separately version 1 to version 40. A dimension of the version 1 is 21*21 modules, and subsequently, each later version has four more modules than a previous version in each of a row direction and a column direction, until the version 40, whose dimension is 177*177 modules.

In some scenarios, a two-dimensional code nay be printed on a very small area, for example, an inner side of a beverage bottle cap. Even if a two-dimensional code of the version 1 is printed on an inner side of a beverage bottle cap, the two-dimensional code cannot be normally identified because the printed pattern is too small.

SUMMARY

It is an aspect to provide a two-dimensional code, a two-dimensional code generation method, identification method, generation apparatus, and identification apparatus, and a computer readable storage medium to address the above-described problems with the related art.

According to an aspect of one or more example embodiments, there is provided a two-dimensional code including a square module array including an array of m*m modules, a location detection pattern and a data information pattern. The location detection pattern determines a location of the two-dimensional code, the data information pattern is configured to carry data information, each module of the array of m*m modules is at least one of a first-type module and a second-type module, a color attribute of the first-type module is different from a color attribute of the second-type module, and m is at least one of 17, 18, 19, and 20.

According to other aspects of one or more example embodiments, there are also provided methods, apparatuses, and computer readable media consistent with the two-dimensional code.

BRIEF DESCRIPTION OF THE DRAWINGS

The accompanying drawings, which are included to provide further understanding and are incorporated and constitute a part of this specification, illustrate disclosed embodiments and together with the description serve to explain the principles of the disclosed embodiments. In the drawings.

DETAILED DESCRIPTION

To make the objectives, technical solutions, and advantages of the present disclosure clearer, the following further describes implementations of the present disclosure in detail with reference to the accompanying drawings.

The example embodiments of this application provide a miniature two-dimensional code. The two-dimensional code includes a square module array of m*m modules, where m=17 or 18 or 19 or 20. Even if printed in a miniature area whose side length is 0.5 cm to 0.7 cm, the two-dimensional code may still be normally identified, and is suitable for being used in a small area application scenario such as an inner side of a bottle cap or a corner of an object.

FIGS. 1A-D are each a schematic structural diagram of an object on which a two-dimensional code is disposed according to an respective example embodiment of the present disclosure. As shown in FIGS. 1A-D, a two-dimensional code 100 is disposed on an object 10. The two-dimensional code 100 includes a square module array of m*m modules. The square module array includes a location detection pattern 101 and a data information pattern 102.

In some embodiments, the object 10 may be a beverage bottle cap, a button, a knob, or the like. A form of the object 10 is not limited by the example embodiments.

In some embodiments, a value of m is, without limitation, less than 21.

Figure 1A:
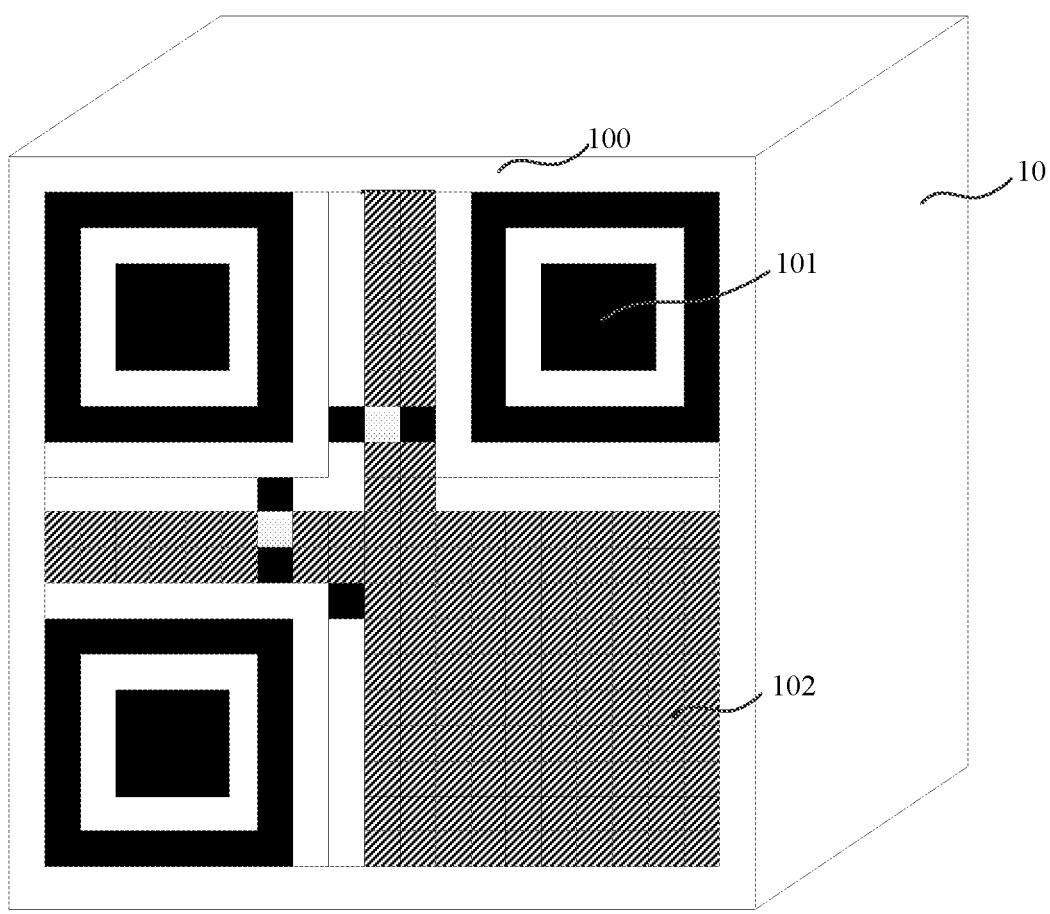
FIG. 1A is a diagram of an object on which an example embodiment of a two-dimensional code is disposed.
Figure 1B:
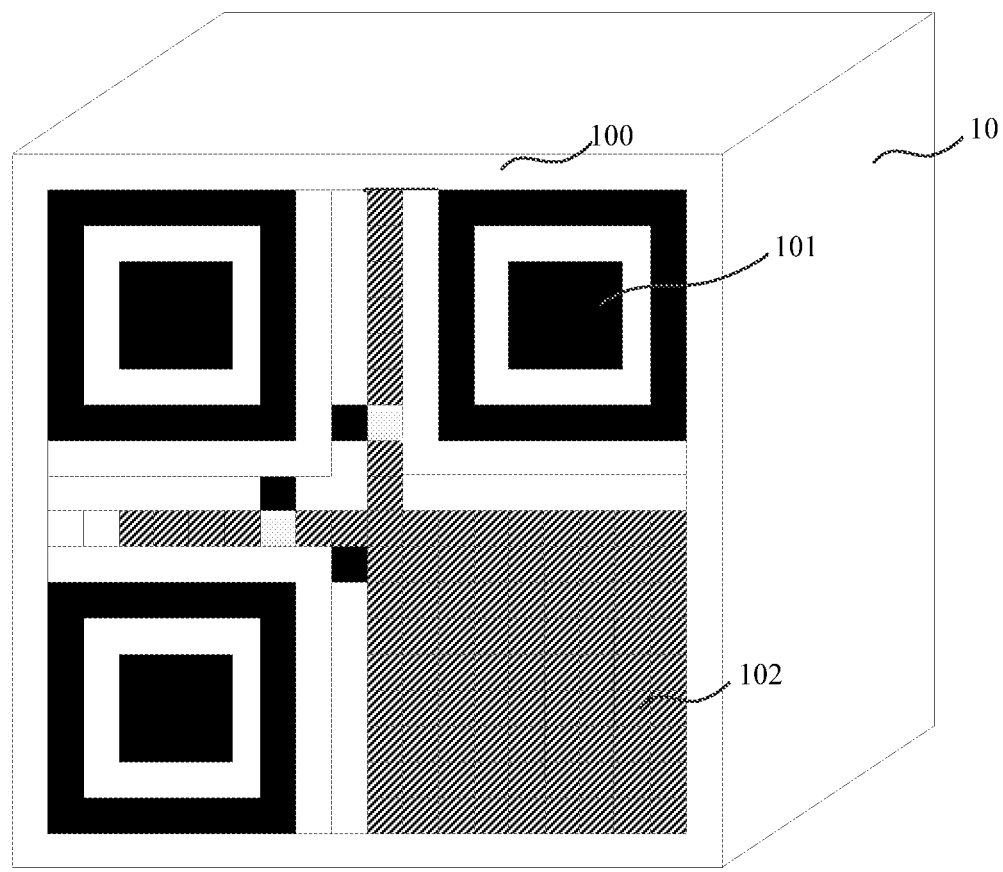
FIG. 1B is a diagram of an object on which an example embodiment of a two-dimensional code is disposed.
Figure 1C:
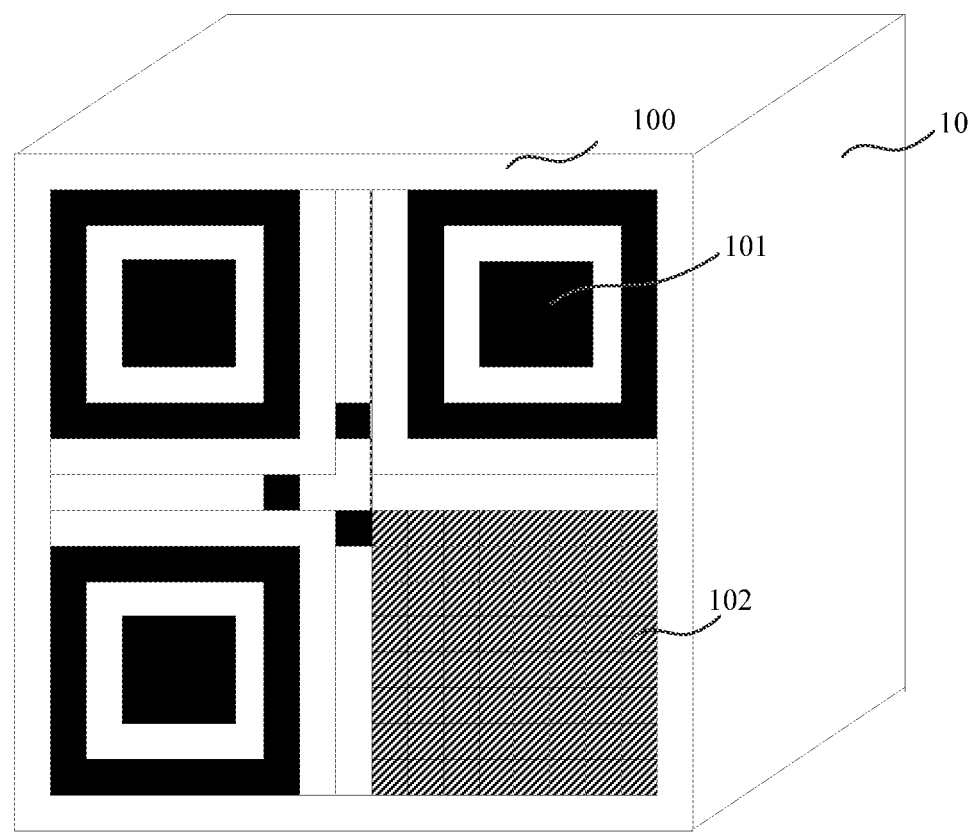
FIG. 1C is a diagram of an object on which another example embodiment of a two-dimensional code is disposed.
Figure 1D:
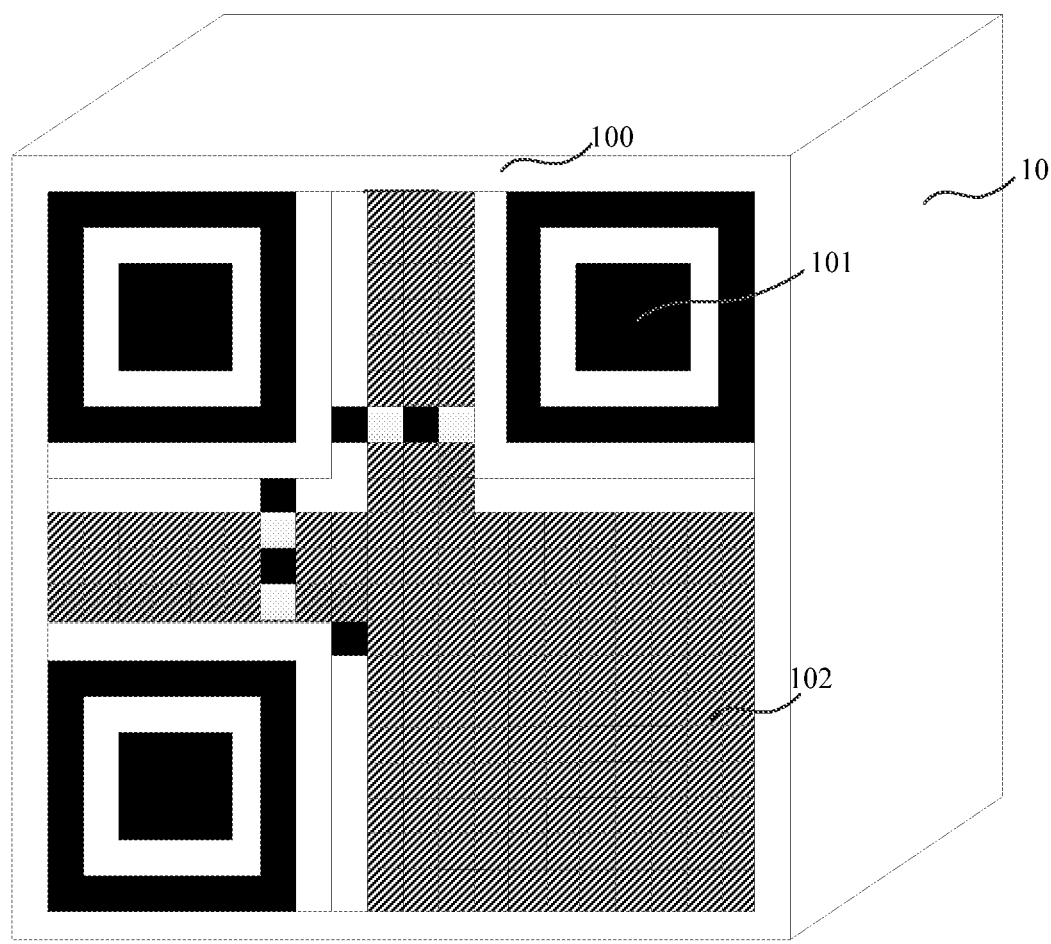
FIG. 1D is a diagram of an object on which another example embodiment of a two-dimensional code is disposed.

In some implementations, m=19, as shown in FIG. 1A. In some implementations, m=17, as shown in FIG. 1B. In some implementations, m=18, as shown in FIG. 1C. In some implementations, m=20, as shown in FIG. 1D.

The location detection pattern 101 is used for determining a location of the two-dimensional code. In some implementations, the location detection pattern 101 includes three identical location detection patterns. The three location detection patterns are separately distributed on an upper left corner, an upper right corner, and a lower left corner of the two-dimensional code.

The data information pattern 102 is used for carrying data. The data information pattern 102 is a dashed area indicated by oblique line boxes in FIG. 1A to FIG. 1D.

Each of the modules is a first-type module or a second-type module, and a color attribute of the first-type module is different from a color attribute of the second-type module. A module is a minimal identification unit in a two-dimensional code. In some implementations, the module is a square.

In some implementations, the first-type module is a dark-colored module, indicating a binary number 1, and the second-type module is a light-colored module, indicating a binary number 0.

Generally, the color attribute of the first-type module is black, and the color attribute of the second-type module is white. A color attribute of a module is not limited in this embodiment. It should be noted that in a different embodiment, the square module array may further be referred to as a square array, a matrix array, a square matrix, or a square matrix array.

In some embodiments, a miniature two-dimensional code is disposed on an object. The miniature two-dimensional code includes a square module array of m*m modules, where m=17 or 18 or 19 or 20. Even if printed in a miniature area whose side length is 0.5 cm to 0.7 cm, the two-dimensional code may still be normally identified, and is suitable for being used in a small area application scenario such as an inner side of a bottle cap or a corner of an object.

It should be noted that a specific type of the object is not limited in this embodiment. In some embodiments, the miniature two-dimensional code may be disposed at a visible location on the object by means of ink-jet printing, pasting, laser printing, electronic display, or the like. The manner in which the object is disposed on the miniature two-dimensional code is not limited in this embodiment.

The structure of the two-dimensional code is described with reference to FIG. 2 to FIG. 4 by using an example embodiment of a two-dimensional code including a square module array of 19*19 modules.

Figure 2:
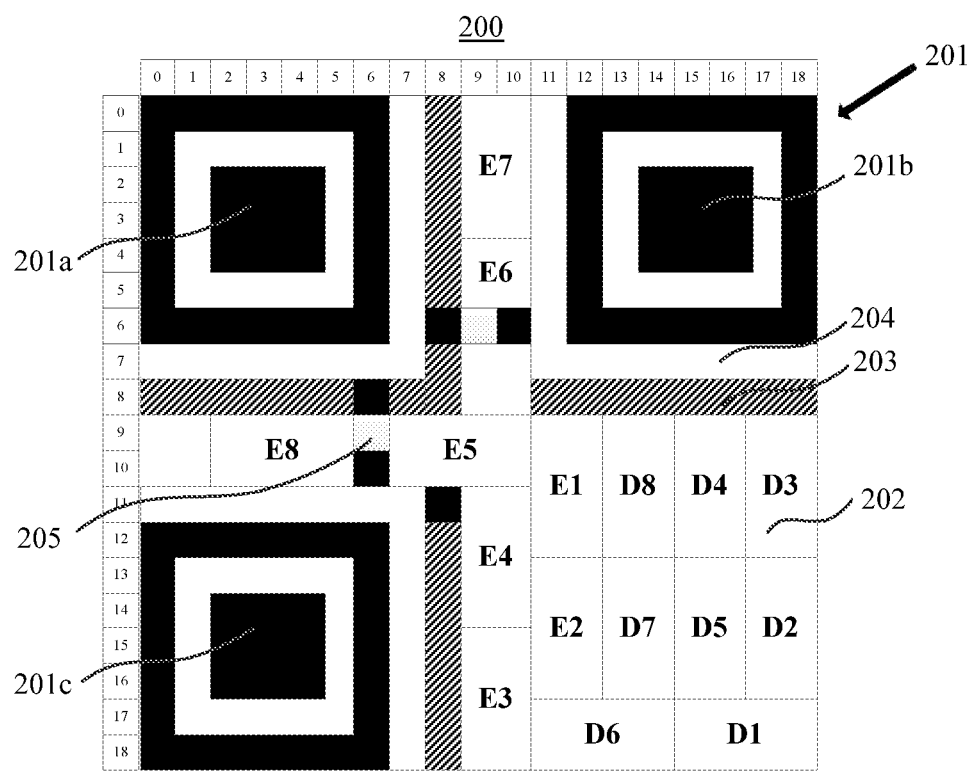
FIG. 2 is a diagram of a two-dimensional code according to an example embodiment of the present disclosure.

FIG. 2 is a schematic structural diagram of a two-dimensional code according to an example embodiment. The two-dimensional code includes a square module array 200 of m*m modules. The square module array 200 includes: a location detection pattern 201, a data information pattern 202, format information 203, and a location detection pattern separator 204.

The location detection pattern 201 includes: a first location detection pattern 201a, a second location detection pattern 201b, and a third location detection pattern 201c.

It is assumed that the square module array 200 includes 19 rows, numbered 0 to 18 from top to bottom; and includes 19 columns, numbered 0 to 18 from left to right, as shown in FIG. 2. It should be noted that the numbers in FIG. 2 are used merely for helping to understand, and do not belong to content included in the two-dimensional code.

The first location detection pattern 201a occupies 7*7 modules in the square module array 200 and whose row coordinates are 0 to 6 and column coordinates are 0 to 6.

The second location detection pattern 201b occupies 7*7 modules in the square module array 200 and whose row coordinates are 0 to 6 and column coordinates are 12 to 18.

The third location detection pattern 201c occupies 7*7 modules in the square module array 200 and whose row coordinates are 12 to 18 and column coordinates are 0 to 6.

In some implementations, each location detection pattern 201 is considered as including three overlapping concentric square arrays. Each module of the square module array of 7*7 modules located at the lowest layer is a first-type module, that is, a dark-colored module. Each module of the square module array of 5*5 modules located at the middle layer is a second-type module, that is, a light-colored module. Each module of the square module array of 3*3 modules located at the middle layer is a first-type module, that is, a dark-colored module.

In some implementations, each location detection pattern 201 is considered as including a square box of 7*7 modules, a square box of 5*5 modules, and a square module array of 3*3 modules, and the three are nested adjacent and do not overlap one another. Each module of the square box of 7*7 modules is a first-type module, that is, a dark-colored module. Each module of the square box of 5*5 modules is a second-type module, that is, a light-colored module. Each module of the square module array of 3*3 modules is a first-type module, that is, a dark-colored module.

The data information pattern 202 is used for carrying data. In some implementations, the data information pattern 202 includes 16 data blocks, each data block occupies eight modules in the square module array 200, and at least one data block occupies eight adjacent modules in the square module array 200. For example, a data block D1 in the figure occupies eight adjacent modules located on a lower right corner.

In some implementations, the data information pattern 202 includes a first-type module and/or a second-type module. Different combinations of the first-type module and/or the second-type module indicate different data information.

In some implementations, when an automatic error correction function is provided, data carried in the data information pattern 202 includes: a data codeword and an error correction codeword corresponding to the data. The error correction codeword is use for implementing automatic error correction of the data.

The square module array 200 further includes format information 203, used for indicating format information of the data during encoding. In some implementations, the format information 203 occupies 30 modules in the square module array 200, which are separately: six modules whose row coordinates are 8 and column coordinates are 0 to 5, two modules whose row coordinates are 8 and column coordinates are 7 and 8, six modules whose column coordinates are 8 and row coordinates are 0 to 5, one module whose column coordinate is 8 and row coordinate is 7, eight modules whose row coordinates are 8 and column coordinates are 11 to 18, and seven modules whose column coordinates are 8 and row coordinates are 12 to 18, as shown by dashed oblique line areas in FIG. 2.

In some implementations, the format information 203 includes a first-type module and/or a second-type module. Different combinations of the first-type module and/or the second-type module indicate different format information.

In some implementations, the format information 203 includes an error correction level corresponding to the error correction codeword. The error correction level includes: an error correction level L, an error correction level I, an error correction level Q, and an error correction level H.

The error correction level L denotes that data that is 7% approximate may be corrected. The error correction level I denotes that data that is 15% approximate may be corrected. The error correction level Q denotes that data that is 25% approximate may be corrected. The error correction level H denotes that data that is 30% approximate may be corrected. The data may also be referred to as a character code.

In some implementations, at the error correction level L, the error correction codeword occupies five data blocks; at the error correction level I, the error correction codeword occupies six data blocks; at the error correction level Q, the error correction codeword occupies seven data blocks; and at the error correction level H, the error correction codeword occupies eight data blocks.

In some implementations, at the error correction level H, the data may occupy a maximum of nine data blocks; at the error correction level Q, the data may occupy a maximum of ten data blocks; at the error correction level I, the data may occupy a maximum of 12 data blocks; and at the error correction level L, the data may occupy a maximum of 13 data blocks.

The error correction level H may be used as an example in FIG. 2. The data carried by the data information pattern 202 occupies 16 data blocks. Numerical digits occupy eight data blocks, and an error correction codeword corresponding to the numerical digits occupies eight data blocks.

In some implementations, the data occupies eight first data blocks D1, D2, D3, D4, D5, D6, D7, and D8. The data block D1 occupies eight modules whose row coordinates are 17 and 18 and column coordinates are 15 to 18. The data block D2 occupies eight modules whose row coordinates are 13 to 16 and column coordinates are 17 and 18. The data block D3 occupies eight modules whose row coordinates are 9 to 12 and column coordinates are 17 and 18. The data block D4 occupies eight modules whose row coordinates are 9 to 12 and column coordinates are 15 and 16. The data block D5 occupies eight modules whose row coordinates are 13 to 16 and column coordinates are 15 and 16. The data block D6 occupies eight modules whose row coordinates are 17 and 18 and column coordinates are 11 to 14. The data block D7 occupies eight modules whose row coordinates are 13 to 16 and column coordinates are 13 and 14. The data block D8 occupies eight modules whose row coordinates are 9 to 12 and column coordinates are 13 and 14.

In some implementations, the error correction codeword occupies eight second data blocks E1, E2, E3, E4, E5, E6, E7, and E8. The data block E1 occupies eight modules whose row coordinates are 9 to 12 and column coordinates are 11 and 12. The data block E2 occupies eight modules whose row coordinates are 13 to 16 and column coordinates are 11 and 12. The data block E3 occupies eight modules whose row coordinates are 15 to 18 and column coordinates are 9 and 10. The data block E4 occupies eight modules whose row coordinates are 11 to 14 and column coordinates are 9 and 10. The data block E5 occupies eight modules whose row coordinates are 9 and 10 and column coordinates are 7 to 10. The data block E6 occupies four modules whose row coordinates are 4 and 5 and column coordinates are 9 and 10 and four modules whose row coordinates are 7 and 8 and column coordinates are 9 and 10. The data block E7 occupies eight modules whose row coordinates are 0 to 3 and column coordinates are 9 and 10. The data block E8 occupies eight modules whose row coordinates are 9 and 10 and column coordinates are 2 to 5.

In some implementations, the square module array 200 may further include a location detection pattern separator 204. The location detection pattern separator 204 is used for separating the location detection pattern 201 and the format information 203, or separating the location detection pattern 201 and the data information pattern 202. The location detection pattern separator 204 is usually a second-type module, that is, a light-colored module.

In some implementations, the location detection pattern separator 204 occupies 45 modules in the square module array 200, which are separately: eight modules whose row coordinates are 7 and column coordinates are 0 to 7, seven modules whose row coordinates are 0 to 6 and column coordinates are 7, eight modules whose row coordinates are 7 and column coordinates are 11 to 18, seven modules whose row coordinates are 0 to 6 and column coordinates are 11, eight modules whose row coordinates are 11 and column coordinates are 0 to 7, and seven modules whose row coordinates are 12 to 18 and column coordinates are 7, as shown in FIG. 2.

In some implementations, the square module array 200 further includes a timing pattern 205. The timing pattern 205 is used for preventing the two-dimensional code from rotating or being reversed. The timing pattern 205 occupies six modules, which are separately: a dark-colored (black) module located in the 6th row and the 8th column, a light-colored (white) module in the 6th row and the 9th column, a dark-colored (black) module in the 6th row and the 10th column, a dark-colored (black) module in the 8th row and the 6th column, a light-colored (white) module in the 9th row and the 6th column, and a dark-colored (black) module in the 10th row and the 6th column.

In this example embodiment, a method for dividing 16 data blocks into eight first data blocks and eight second data blocks according to data codewords and error correction codewords is an example division method. A data block division manner of a data codeword and an error correction codeword corresponding to data is not limited by this embodiment.

There are mainly two ways of printing a two-dimensional code: ink-jet printing and laser printing. In some scenarios, a two-dimensional code needs to be printed on a very small area, for example, an inner side of a beverage bottle cap. In this case, the laser printing is preferentially used. Because a two-dimensional code includes a dark-colored (black) module and a light-colored (white) module, efficiency of the laser printing is inversely proportional to a quantity of light-colored modules. The two-dimensional code shown in FIG. 2 includes 230 light-colored modules on average. Because there are too many light-colored modules, production efficiency of printing is reduced.

Figure 3:
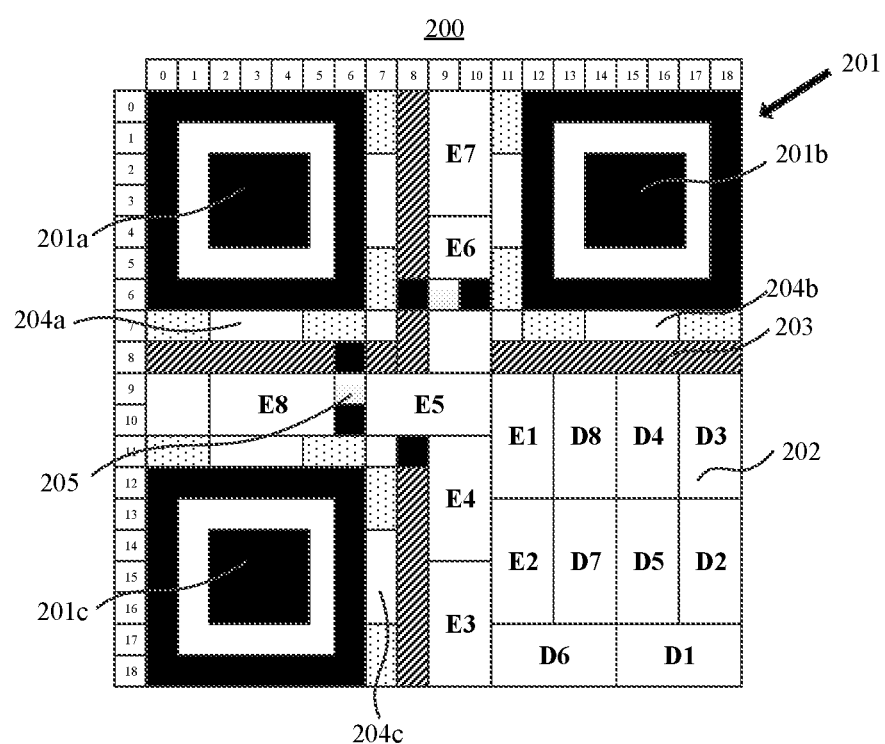
FIG. 3 is a diagram of a two-dimensional code according to another example embodiment of the present disclosure.

Referring to FIG. 3, based on the example embodiment shown in FIG. 2, light-colored modules in the location detection pattern separator 204 are reduced.

In the example embodiment shown in FIG. 3, at least one of i (=45) modules occupied by the location detection pattern separator 204 in the square module array 200 is a first-type module, that is, a dark-colored module.

In some implementations, the location detection pattern separator 204 includes a first location detection pattern separator 204a, a second location detection pattern separator 204b, and a third location detection pattern separator 204c.

The first location detection pattern separator 204a occupies 15 modules in the square module array 200, which are separately: eight modules whose row coordinates are 0 to 7 and column coordinates are 7, and seven modules whose row coordinates are 7 and column coordinates are 0 to 6.

The second location detection pattern separator 204b occupies 15 modules in the square module array 200, which are separately: eight modules whose row coordinates are 0 to 7 and column coordinates are 11, and seven modules whose row coordinates are 7 and column coordinates are 12 to 18.

The third location detection pattern separator 204c occupies 15 modules in the square module array 200, which are separately: eight modules whose row coordinates are 11 to 18 and column coordinates are 7, and seven modules whose row coordinates are 11 and column coordinates are 0 to 6.

In the location detection pattern separator, at least one of 24 modules located in the 0th row and the 7th column, the 0th row and the 11th column, the 1st row and the 7th column, the 1st row and the 11th column, the 5th row and the 7th column, the 5th row and the 11th column, the 6th row and the 7th column, the 6th row and the 11th column, the 7th row and the 0th column, the 7th row and the 1st column, the 7th row and the 5th column, the 7th row and the 6th column, the 7th row and the 12th column, the 7th row and the 13th column, the 7th row and the 17th column, the 7th row and the 18th column, the 11th row and the 0th column, the 11th row and the 1st column, the 11th row and the 5th column, the 11th row and the 6th column, the 12th row and the 7th column, the 13th row and the 7th column, the 17th row and the 7th column, the 18th row and the 7th column is a first-type module, that is, a dark-colored (black) module.

In some embodiments, at least one of i modules occupied by a location detection pattern separator is set to a dark-colored modules. This reduces a quantity of light-colored modules, and improves two-dimensional code printing and production efficiency while normal identification of the two-dimensional code is not affected.

Figure 4:
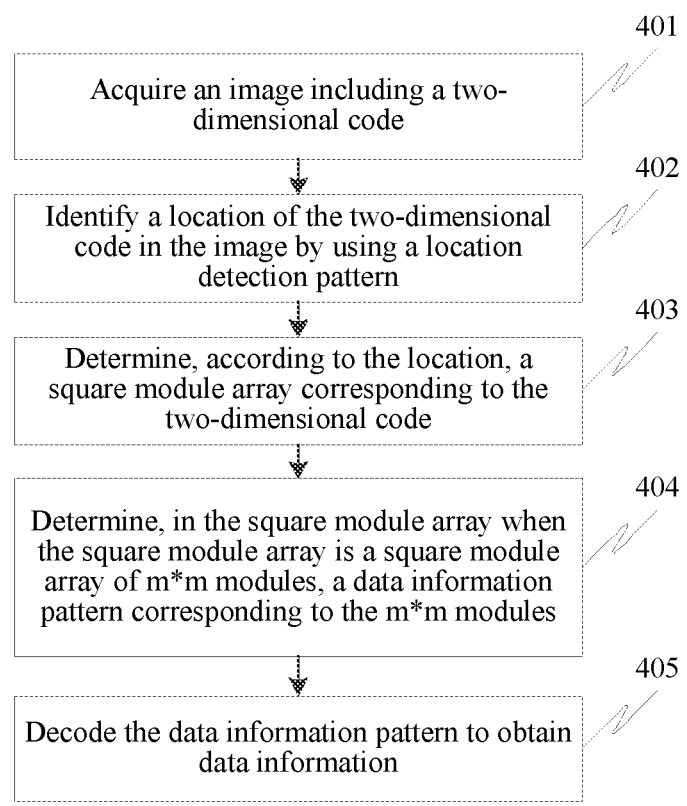
FIG. 4 is a flowchart of a two-dimensional code identification method according to an example embodiment of the present disclosure.

FIG. 4 is a flowchart of a two-dimensional code identification method according to an example embodiment. The two-dimensional code identification method may be used to identify the two-dimensional code shown in FIG. 1 to FIG. 3. The two-dimensional code identification method may be performed by a terminal or a server. The two-dimensional code identification method includes the following:

Step 401. Acquire an image including a two-dimensional code.

Step 402. Identify a location of the two-dimensional code in the image by using a location detection pattern.

Step 403. Determine, according to the location, a square module array corresponding to the two-dimensional code.

Step 404. Determine, in the square module array when the square module array is a square module array of m*m modules, a data information pattern corresponding to the m*m modules, where m=17 or 18 or 19 or 20.

Step 405. Decode the data information pattern to obtain data.

Each of the modules is a first-type module or a second-type module, and a color attribute of the first-type module is different from a color attribute of the second-type module.

In some implementations, in addition to the square module array of m*m modules, the two-dimensional code may further include text, an icon, and a video. The text, icon, and video cover a partial area (for example, a middle area) in the two-dimensional code. Visible content of the two-dimensional code is not limited by this example embodiment.

According to the two-dimensional code identification method provided by an example embodiment, when a square module array is a square module array of m*m modules, a data information pattern corresponding to the m*m modules is determined in the square module array, where m=17 or 18 or 19 or 20. Even if printed in a very small area, for example, a miniature area whose side length is 0.5 cm to 0.7 cm, the two-dimensional code may still be normally identified, and is suitable for being used in a small area application scenario such as an inner side of a bottle cap or a corner of an object.

Figure 5:
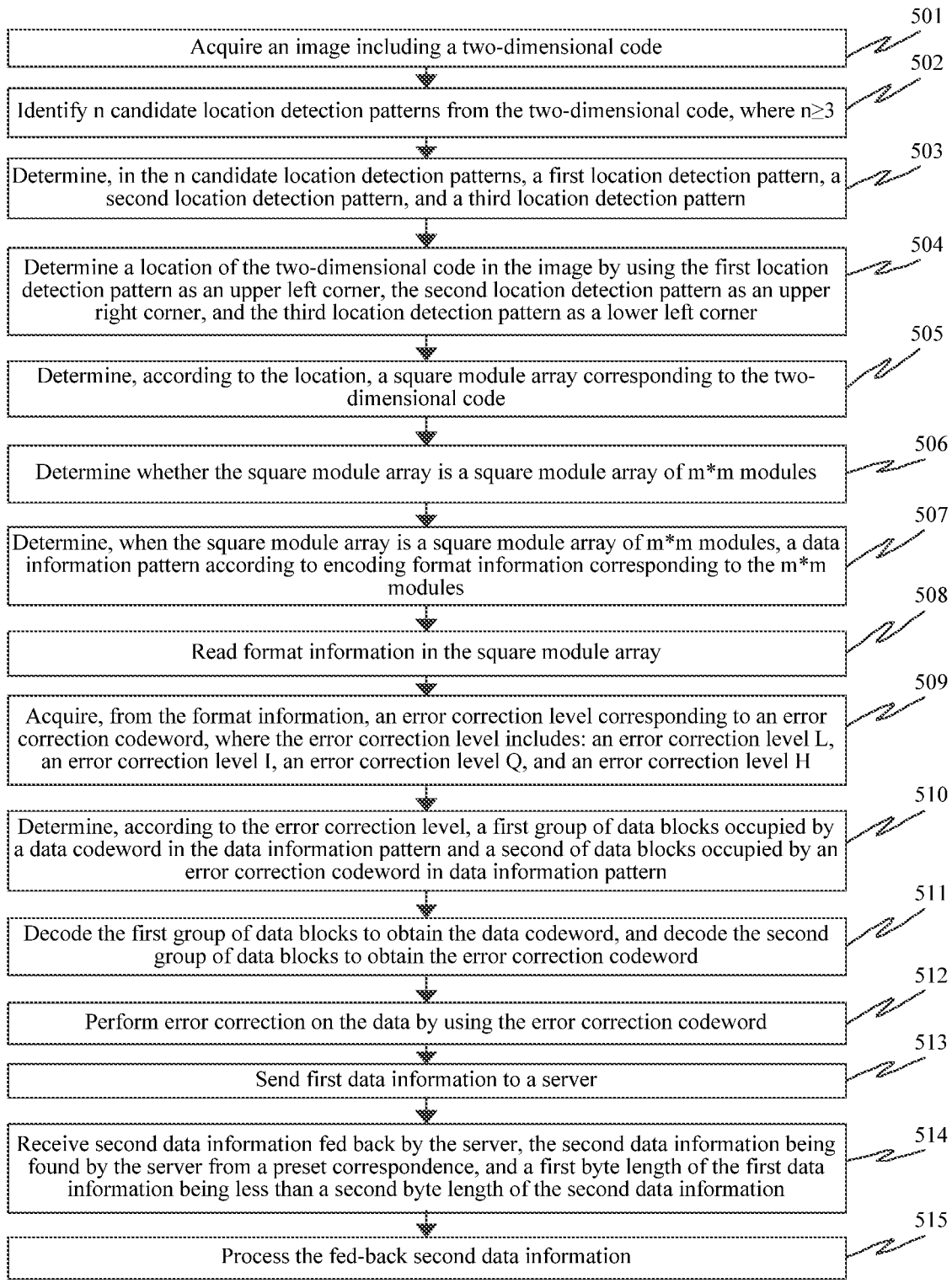
FIG. 5 is a flowchart of a two-dimensional code identification method according to another example embodiment of the present disclosure.

FIG. 5 is a flowchart of a two-dimensional code identification method according to another example embodiment. FIG. 5 provides additional details of the method shown in FIG. 4. The two-dimensional code identification method includes the following.

Step 501. Acquire an image including a two-dimensional code.

An example method of obtaining, by a terminal, an image including a two-dimensional code includes but is not limited to: placing an image including a two-dimensional code in an identification frame, or selecting an image including a two-dimensional code from an album, or long pressing an image including a two-dimensional code.

In some implementations, after obtaining the image including the two-dimensional code, the terminal performs binarization on the image in which the two-dimensional code is set. Binarization is an image process manner, in which a pixel whose gray scale is greater than a threshold is changed to a black pixel, and a pixel whose gray scale is less than a threshold is changed to a white pixel. In an image on which binarization has been performed, the first-type module in the square module array is unitized as a black module, and the second-type module is unitized as a white module.

Step 502. Identify n candidate location detection patterns from the two-dimensional code, where n≥3.

In some implementations, the terminal scans the image row by row from top to bottom, or scans the image column by column from left to right.

When seven scanned adjacent modules in a same row (or a same column) are sequentially: a black module, a white module, a black module, a black module, a black module, a white module, and a black module, and a quantity ratio of the black module to the white module to the black module to the white module to the black module is 1:1:3:1:1, the black module whose ratio value is 3 is used to locate a candidate location detection pattern.

After all rows in the image are scanned, n candidate location detection patterns are obtained.

Step 503. Determine, in the n candidate location detection patterns, a first location detection pattern, a second location detection pattern, and a third location detection pattern.

In some implementations, the terminal sorts the candidate location detection patterns in descending order of matching degrees between the candidate location detection patterns and a reference location detection pattern; and determines, in top three of the location detection patterns, the first location detection pattern, the second location detection pattern, and the third location detection pattern. The matching degree may be a matching degree between a candidate location detection pattern and a standard location detection pattern, and is determined by the terminal during scanning.

In another implementation, the terminal draws lines connecting centers of every three of the candidate location detection patterns to obtain several corresponding triangles; determines a triangle having a highest similarity with an isosceles right triangle and whose longest side is the longest; and determines, in the three candidate location detection patterns corresponding to the determined triangle, the first location detection pattern, the second location detection pattern, and the third location detection pattern.

Step 504. Determine a location of the two-dimensional code in the image by using the first location detection pattern as an upper left corner, the second location detection pattern as an upper right corner, and the third location detection pattern as a lower left corner.

The location of the two-dimensional code in the image may be rotated, inclined, enlarged, diminished, distorted, or reversed. Therefore, the terminal may locate the location of the two-dimensional code in the image by using the first location detection pattern, the second location detection pattern, and the third location detection pattern.

Step 505. Determine, according to the location, a square module array corresponding to the two-dimensional code.

In some implementations, perspective transformation is performed according to the location of the two-dimensional code in the image. The two-dimensional code is projected to a fixed-sized matrix, to obtain a front view of the square module array corresponding to the two-dimensional code.

Step 506. Determine whether the square module array is a square module array of m*m modules, where m=17 or 18 or 19 or 20.

In some implementations, it is determined, according to a distance between the first location detection pattern and the second location detection pattern, a width of the first location detection pattern, or a width of the second location detection pattern, whether the square module array is a square module array of m*m modules.

Because the width of the first location detection pattern or the second location detection pattern is seven modules, the terminal may determine a type of the square module array according to the distance between the first location detection pattern and the second location detection pattern, or the width of the first location detection pattern or the second location detection pattern.

When the distance between the first location detection pattern and the second location detection pattern is five modules, and the width of the first location detection pattern or the second location detection pattern is seven module, it is determined that the square module array is a square module array of m*m modules.

In some implementations, it is determined, according to a distance between the first location detection pattern and the third location detection pattern, a width of the first location detection pattern, or a width of the third location detection pattern, whether the square module array is a square module array of m*m modules.

When the distance between the first location detection pattern and the third location detection pattern is five modules, and the width of the first location detection pattern or the third location detection pattern is seven module, it is determined that the square module array is a square module array of m*m modules.

When the square module array is a type of square module array of 21*21 modules, 25*25 modules, or 29*29 modules, identification is performed according to identification manners corresponding to versions 1 to 40 of the two-dimensional code.

Step 507. Determine, when the square module array is a square module array of m*m modules, a data information pattern according to encoding format information corresponding to the m*m modules.

In some implementations, the terminal prestores encoding format information of a square module array of m*m modules. When the square module array is a square module array of m*m modules, a data information pattern is determined by using encoding format information corresponding to the m*m modules.

Step 508. Read format information in the square module array.

Step 509. Acquire, from the format information, an error correction level corresponding to an error correction codeword, where the error correction level includes: an error correction level L, an error correction level I, an error correction level Q, and an error correction level H.

Step 510. Determine, according to the error correction level, a first group of data blocks occupied by a data codeword in the data information pattern and a second of data blocks occupied by an error correction codeword in data information pattern.

Step 511. Decode the first group of data blocks to obtain the data codeword, and decode the second group of data blocks to obtain the error correction codeword.

Step 512. Perform error correction on the data by using the error correction codeword.

In some implementations, when the square module array corresponding to the two-dimensional code includes an incomplete part, or the square module array includes an icon, text, or other interference information, error correction may be performed on the data by using the error correction codeword.

It should be noted that the error correction codeword may be used to correct two types of errors: a read rejection error and a replacement error. A read rejection error refers to data that is not scanned or cannot be decoded when a location of erroneous data is known. A replacement error refers to data that is incorrectly decoded when a location of erroneous data is unknown. For example, when a bug/error makes a dark-colored module change to a light-colored module, or changes a light-colored module to a dark-colored module, that is, when data is incorrectly decoded to data that is seemingly valid but is actually another piece of data, this type of data replacement error needs to be corrected by using two error correction codewords.

In some implementations, the data obtained by decoding the two-dimensional code is first data information. The first data information is an identifier (or an index) of the second data information. The second data information is information having practical meaning. For example, the second data information includes at least one of: a uniform resource locator (URL), image information, audio information, text information, video information, and a prize drawing result.

The first data information has a first byte length, the second data information has a second byte length, and the first byte length is less than the second byte length. Exemplarily, the first byte length is 72, that is, nine characters. The second byte length is not limited.

Step 513. Send first data information to a server.

When second data information corresponding to the first data information needs to be learned, the first data information is sent to the server.

The server stores a preset correspondence between the first data information and the second data information.

The preset correspondence may be prestored. For example, the first data information is information obtained by performing hash computation on the second data information. Then, the server stores the first data information and the second data information in a preset correspondence. For another example, the server presets a first data information repository. The first data information repository includes unused first data information. When there is second data information, the server allocates, from the first data information repository, the first data information corresponding to the second data information.

The preset correspondence may also be calculated in real time according to an algorithm. For example, the server calculates, in real time according to a prize drawing algorithm, the second data information corresponding to the first data information. The second data information is a prize drawing result page corresponding to the prize drawing result.

The server receives the sent first data information, searches the preset correspondence for the second data information corresponding to the first data information, and returns the second data information.

Step 514. Receive second data information fed back by the server, the second data information being found by the server from a preset correspondence, and a first byte length of the first data information being less than a second byte length of the second data information.

Step 515. Process the fed-back second data information.

For example, when the second data information is a URL, a web page corresponding to the URL is jumped to. When the second data information is image information, content corresponding to the image information is displayed. When the second data information is audio information, content corresponding to the audio information is played. When the second data information is text information, content corresponding to the text information is displayed. When the second data information is video information, content corresponding to the video information is played. When the second data information is a prize drawing result, the prize drawing result is displayed.

It should be noted that the foregoing steps are performed by the terminal.

The foregoing steps may alternatively be performed by the server. This is not limited by this embodiment.

As a summary, according to the two-dimensional code identification method provided in this example embodiment, when a square module array is a square module array of m*m modules, a data information pattern corresponding to the m*m modules is determined in the square module array, where m=17 or 18 or 19 or 20. Even if printed in a miniature area whose side length is 0.5 cm to 0.7 cm, the two-dimensional code may still be normally identified, and is suitable for being used in a small area application scenario such as an inner side of a bottle cap or a corner of an object.

In this example embodiment, the first data information corresponding to the second data information is further generated, a first byte length of the first data information being less than a second byte length of the second data information. In this case, even if the second byte length of the second data information is very long, the two-dimensional code may still be generated. The two-dimensional code has a much smaller area than a regular two-dimensional code, but has a use range that is not obviously different from that of the regular two-dimensional code.

According to the two-dimensional code identification method provided in this example embodiment, a terminal further draws lines connecting centers of every three candidate location detection patterns to obtain several corresponding triangles; determines a triangle having a highest similarity with an isosceles right triangle and whose longest side is the longest; and determines, in the three candidate location detection patterns corresponding to the determined triangle, a first location detection pattern, a second location detection pattern, and a third location detection pattern. In this way, the feature of forming an isosceles right triangle by using three location detection patterns is fully utilized, to accurately determine three location detection patterns from multiple groups of location detection patterns, thereby improving two-dimensional code identification accuracy.

Figure 6:
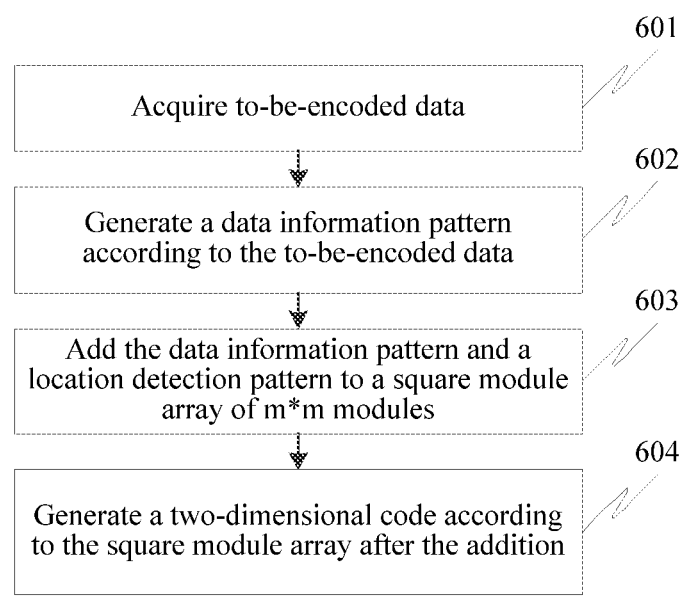
FIG. 6 is a flowchart of a two-dimensional code generation method according to an example embodiment of the present disclosure.

FIG. 6 is a flowchart of a two-dimensional code generation method according to an example embodiment of this application. The two-dimensional code generation method may be performed by a terminal or a server. The two-dimensional code generation method includes the following:

Step 601. Acquire to-be-encoded data.

Step 602. Generate a data information pattern according to the to-be-encoded data.

Step 603. Add the data information pattern and a location detection pattern to a square module array of m*m modules, m=17 or 18 or 19 or 20.

Step 604. Generate a two-dimensional code according to the square module array after the addition.

The location detection pattern is used for determining a location of the two-dimensional code, the data information pattern is used for carrying the data, each of the modules is a first-type module or a second-type module, and a color attribute of the first-type module is different from a color attribute of the second-type module.

According to the two-dimensional code generation method provided in this example embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

Figure 7:
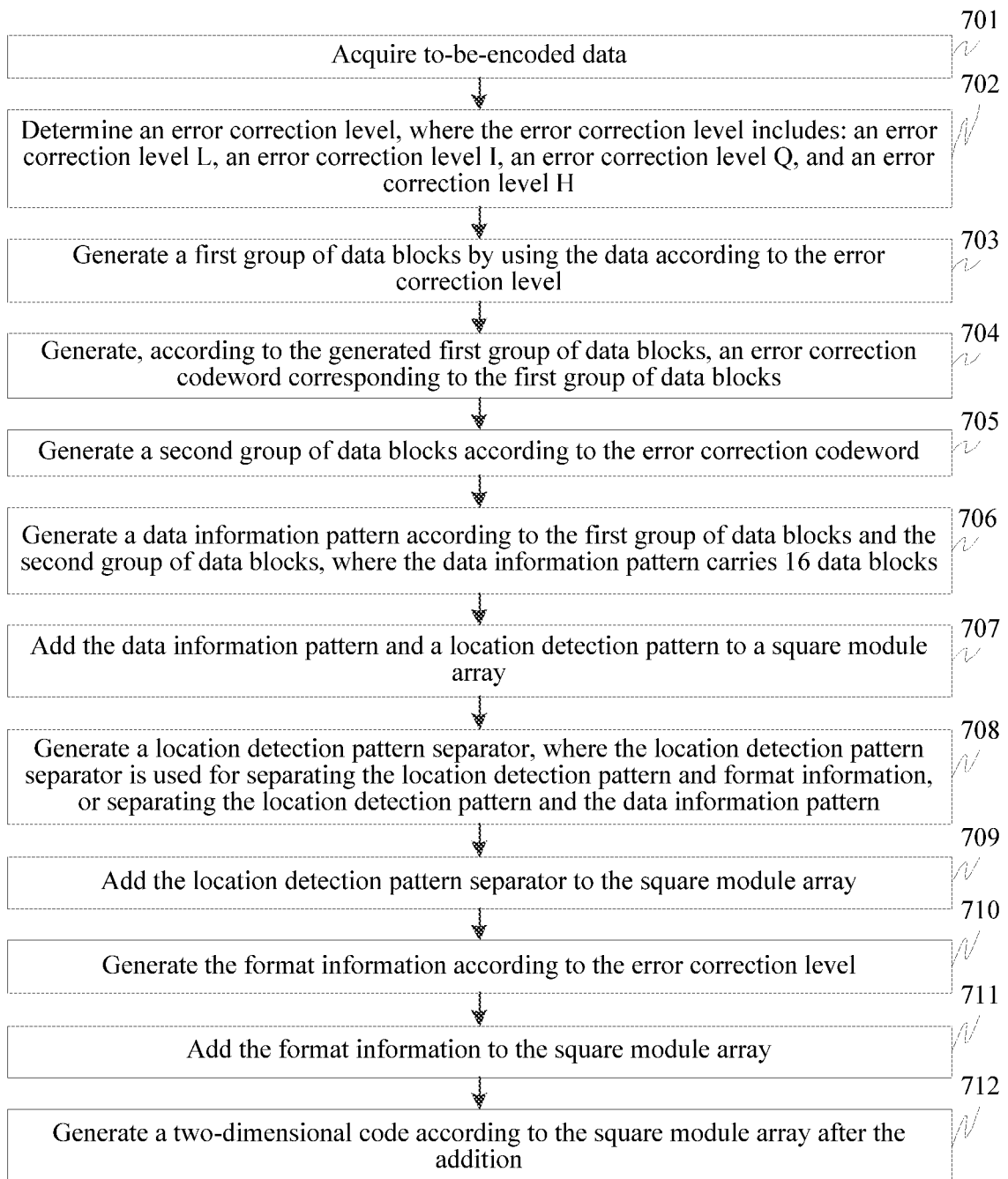
FIG. 7 is a flowchart of a two-dimensional code generation method according to another example embodiment of the present disclosure.

FIG. 7 is a flowchart of a two-dimensional code generation method according to another example embodiment. The example generation method includes the following.

Step 701. Acquire to-be-encoded data.

In some implementations, the server determines a character type of the to-be-encoded data, and encodes the data according to a character set corresponding to the character type.

A coded character set may be a character set including, without limitation, numeric data, alphabetic-numeric data, eight-bit-byte data, or a Chinese character.

Using alphabetic-numeric data as an example, the alphabetic-numeric data includes 45 characters: numerical digits 0 to 9, capitalized letters A to Z, and nine other characters.

TABLE 1

| Character | Value |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| A | 10 |
| B | 11 |
| C | 12 |
| D | 13 |
| E | 14 |
| F | 15 |
| G | 16 |
| H | 17 |
| I | 18 |
| J | 19 |
| K | 20 |
| L | 21 |
| M | 22 |
| N | 23 |
| O | 24 |
| P | 25 |
| Q | 26 |
| R | 27 |
| S | 28 |
| T | 29 |
| U | 30 |
| V | 31 |
| W | 32 |
| X | 33 |
| Y | 34 |
| Z | 35 |
| SP | 36 |
| $ | 37 |
| % | 38 |
| * | 39 |
| + | 40 |
| - | 41 |
| . | 42 |
| / | 43 |
| : | 44 |

Step 702. Determine an error correction level, where the error correction level includes: an error correction level L, an error correction level I, an error correction level Q, and an error correction level H.

In some implementations, the server reads a default error correction level, and determines the default error correction level as an error correction level that needs to be used currently.

In some implementations, the server stores a correspondence between a data type and an error correction level. For example, when the data type is a website, a first error correction level is used; and when the data type is an avatar, a second error correction level is used. The server determines a corresponding error correction level from the correspondence according to a data type of data encoded currently.

Step 703. Generate a first group of data blocks by using a data codeword according to the error correction level.

In some implementations, after determining the error correction level, the server performs data encoding on the data codeword according to a character set. The data encoding is to convert a data codeword into a binary bit stream, and divide the generated binary bit stream into several data blocks, where the data blocks are grouped every 8 bits.

Step 704. Generate, according to the generated first group of data blocks, an error correction codeword corresponding to the first group of data blocks.

In some implementations, the error correction algorithm is Reed-Solomon error correction.

Step 705. Generate a second group of data blocks according to the error correction codeword.

Step 706. Generate a data information pattern according to the first group of data blocks and the second group of data blocks, where the data information pattern includes 16 data blocks.

For example, at the error correction level H, data carried by the data information pattern occupies 16 data blocks, the first group of data blocks occupies eight data blocks, the second group of data blocks occupies eight data blocks, each data block occupies eight modules in the square module array, and at least one data block occupies eight adjacent modules in the square module array.

It should be noted that in the square module array of m*m modules, there are four remainder bits. A remainder bit is a module quantity to be added to a final binary bit stream to exactly fill the data information pattern.

Step 707. Add the data information pattern and a location detection pattern to a square module array.

In some implementations, the server includes a blank square module array of m*m modules. The server adds the data information pattern and the location detection pattern to corresponding locations in the blank square module array.

Step 708. Generate a location detection pattern separator, where the location detection pattern separator is used for separating the location detection pattern and format information, or separating the location detection pattern and the data information pattern.

In some implementations, the location detection pattern separator exists in i modules occupied by the square module array, and at least one of the i modules is the first-type module, that is, a dark-colored module.

Step 709. Add the location detection pattern separator to the square module array.

In some implementations, in the location detection pattern separator, at least one of 24 modules located in the 0th row and the 7th column, the 0th row and the 17th column, the 1st row and the 7th column, the 1st row and the 11th column, the 5th row and the 7th column, the 5th row and the 11th column, the 6th row and the 7th column, the 6th row and the 11th column, the 7th row and the 0th column, the 7th row and the 1st column, the 7th row and the 5th column, the 7th row and the 6th column, the 7th row and the 12th column, the 7th row and the 13th column, the 7th row and the 17th column, the 7th row and the 18th column, the 11th row and the 0th column, the 11th row and the 1st column, the 11th row and the 5th column, the 11th row and the 6th column, the 12th row and the 7th column, the 13th row and the 7th column, the 17th row and the 7th column, the 18th row and the 7th column is a first-type module, that is, a dark-colored (black) module, as shown in the example embodiment in FIG. 3.

Step 710. Generate the format information according to the error correction level.

Step 711. Add the format information to the square module array.

Figure 8:
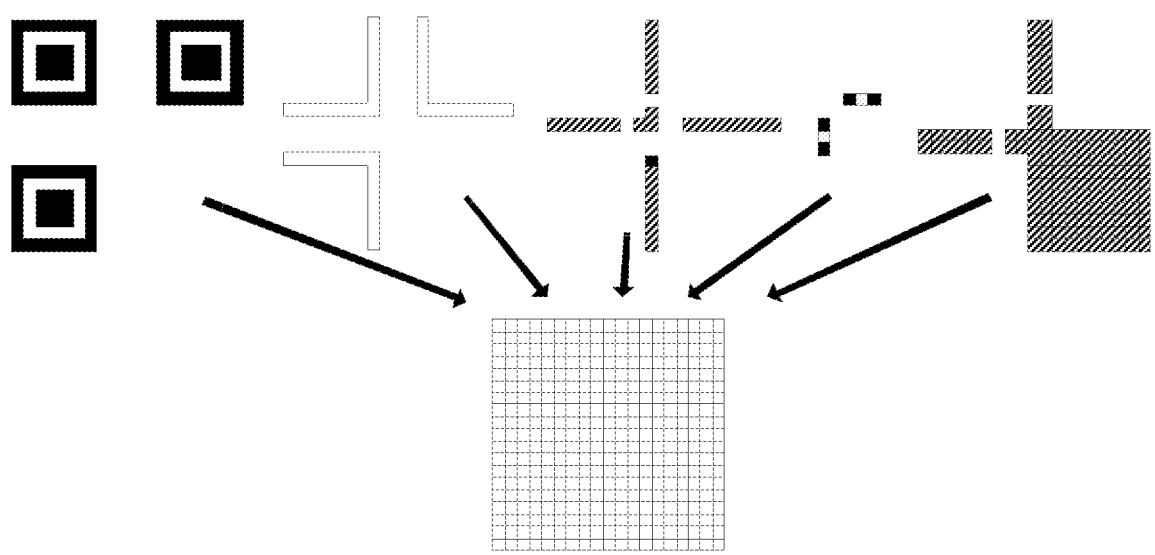
FIG. 8 is a diagram of the various sub-parts generated by a two-dimensional code generation method according to an example embodiment of the present disclosure.

It should be noted that in some implementations, step 707, step 709, and step 711 of the example method may be performed at the same time or in a sequential order. The sequential order in which the three steps are performed is not limited by this example embodiment. With reference to FIG. 8, the data information pattern, the location detection pattern, the location detection pattern separator, and the format information are added to the square module array.

Step 712. Generate a two-dimensional code according to the square module array after the addition.

In conclusion, according to the two-dimensional code generation method provided in this example embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

In some embodiments, a location detection pattern separator exists in i modules occupied by the square module array, and at least one of the i modules is a first-type module. This reduces a quantity of light-colored modules. In this way, two-dimensional code printing and production efficiency is improved while normal identification of the two-dimensional code is not affected.

Figure 9:
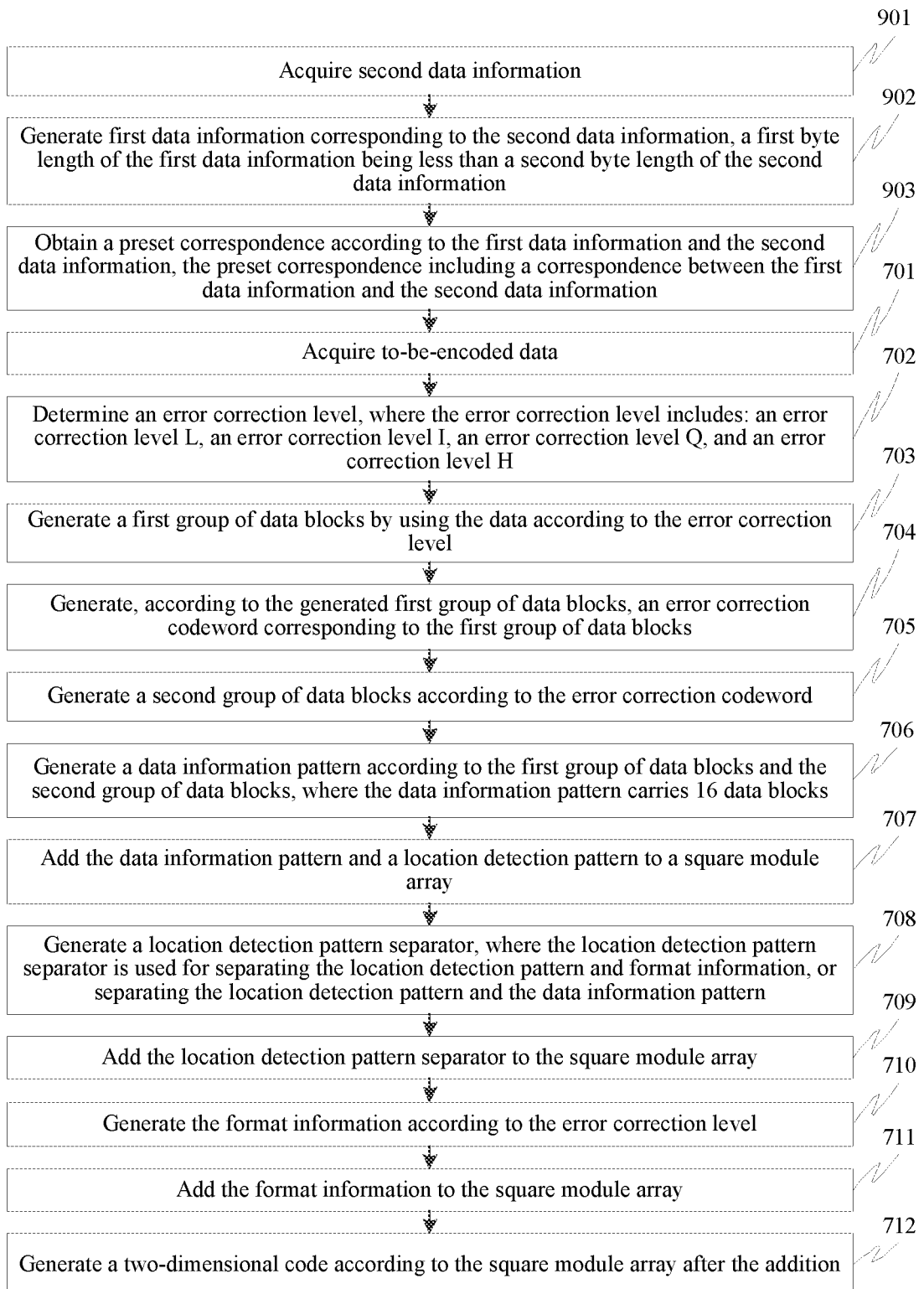
FIG. 9 is a flowchart of a two-dimensional code generation method according to still another example embodiment of the present disclosure.

FIG. 9 is a flowchart of a two-dimensional code generation method according to still another example embodiment. The example method in FIG. 9 shows additional details of the example method shown in FIG. 7. In some implementations, before step 701 of FIG. 7, the generation method may further include steps 901 to 903 shown in FIG. 9.

Step 901. Acquire second data information.

In some implementations, the second data information is information having practical meaning. The second data information includes at least one of: a URL, image information, audio information, text information, video information, and a prize drawing result.

Step 902. Generate first data information corresponding to the second data information, a first byte length of the first data information being less than a second byte length of the second data information.

The first data information is an identifier (or an index) of the second data information. The second data information is information having practical meaning. The first data information has a first byte length, the second data information has a second byte length, and the first byte length is less than the second byte length. Exemplarily, the first byte length is 72, that is, nine characters. The second byte length is not limited.

In some implementations, the server performs hash computation on the second data information to obtain the first data information. That is, the first data information is a hash value of the second data information.

For example, the second data information is "http://iteycunl.coi/topic/577820", and after hash computation is performed, obtained first data information is "652384914".

In some implementations, a first data information repository is preset in the server, and the first data information repository includes unused first data information. When there is second data information, the server allocates, from the first data information repository, first data information corresponding to the second data information.

As another example, the first data information is an information identifier, and the second data information is a URL. An information identifier library (first data information repository) is preset in the server. The information identifier library includes 1000 unused information identifiers. When acquiring a new URL, the server allocates, from the information identifier library, an information identifier corresponding to the URL.

Step 903. Obtain a preset correspondence according to the first data information and the second data information, the preset correspondence including a correspondence between the first data information and the second data information.

The server stores the first data information and the second data information in the preset correspondence.

The server may determine the first data information as the to-be-encoded data, and enters step 701.

In conclusion, according to the two-dimensional code generation method provided in this example embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

In this example embodiment, a location detection pattern separator exists in i modules occupied by the square module array, and at least one of the i modules is a first-type module. This reduces a quantity of light-colored modules, and improves two-dimensional code printing and production efficiency while normal identification of the two-dimensional code is not affected.

In this example embodiment, first data information corresponding to second data information is further generated, and a first byte length of the first data information is less than a second byte length of the second data information. In this case, even if the second byte length of the second data information is very long, the two-dimensional code may still be generated. The two-dimensional code has a much smaller area than a regular two-dimensional code, but has a use range that is not obviously different from that of the regular two-dimensional code.

Figure 10:
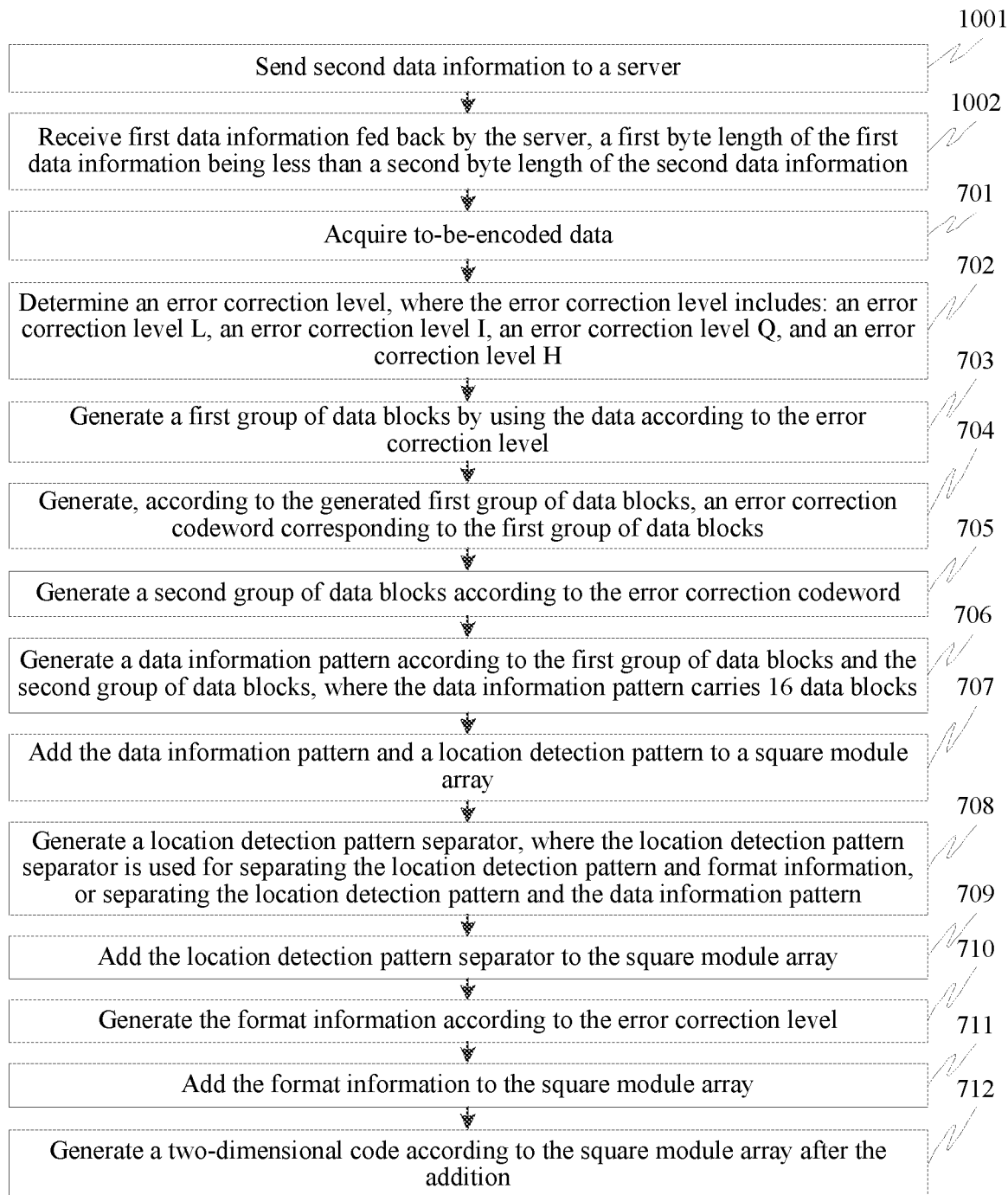
FIG. 10 is a flowchart of a two-dimensional code generation method according to yet another example embodiment of the present disclosure.

It should be noted that the foregoing example embodiment is described by using an example in which the foregoing steps are performed by a server. In still another possible embodiment, the foregoing steps may be performed by a terminal. In this case, step 901, step 902, and step 903 may be alternatively implemented as step 1001 and step 1002, as shown in FIG. 10.

Step 1001. Send second data information to a server.

In some implementations, the second data information is information having practical meaning. The second data information includes at least one of: a URL, image information, audio information, text information, video information, and a prize drawing result.

Step 1002. Receive first data information fed back by the server, a first byte length of the first data information being less than a second byte length of the second data information.

The first data information may be an identifier (or an index) of the second data information. The second data information is information having practical meaning. The first data information has a first byte length, the second data information has a second byte length, and the first byte length is less than the second byte length. Exemplarily, the first byte length is 72, that is, nine characters. The second byte length is not limited.

In some implementations, the server performs hash computation on the second data information to obtain the first data information. That is, the first data information is a hash value of the second data information.

As an example, the second data information may be "http://iteycunl.coi/topic/577820", and after hash computation is performed, obtained first data information is "652384914".

In some implementations, a first data information repository is preset in the server, and the first data information repository includes unused first data information. When there is second data information, the server allocates, from the first data information repository, first data information corresponding to the second data information.

As another example, the first data information is an information identifier, and the second data information is a URL. An information identifier library (first data information repository) is preset in the server. The information identifier library includes 1000 unused information identifiers. When acquiring a new URL, the server allocates, from the information identifier library, an information identifier corresponding to the URL.

The terminal may determine the first data information as the to-be-encoded data, and enters step 701.

In conclusion, according to the two-dimensional code generation method provided in this example embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

In this example embodiment, a location detection pattern separator exists in i modules occupied by the square module array, and at least one of the i modules is a first-type module. This reduces a quantity of light-colored modules, and improves two-dimensional code printing and production efficiency while normal identification of a two-dimensional code is not affected.

In this example embodiment, first data information fed back by a server is received, where a first byte length of the first data information is less than a second byte length of second data information. In this way, a byte length of to-be-encoded data is reduced while normal identification of the two-dimensional code is not affected.

The following is a description of some apparatuses according to example embodiments. For details that are not elaborated in the apparatus embodiments, reference may be made to the foregoing method embodiments that are in a one-to-one correspondence with the apparatus embodiments.

Figure 11:
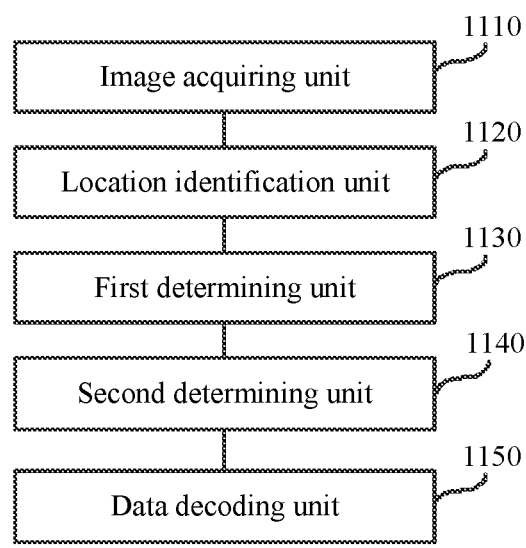
FIG. 11 is a schematic structural diagram of a two-dimensional code identification apparatus according to an example embodiment of the present disclosure.

FIG. 11 is a schematic structural diagram of a two-dimensional code identification apparatus according to an example embodiment. The apparatus includes:

an image acquiring unit 1110, configured to acquire an image including a two-dimensional code;

a location identification unit 1120, configured to identify a location of the two-dimensional code in the image by using the location detection pattern;

a first determining unit 1130, configured to determine, according to the location, a square module array corresponding to the two-dimensional code;

a second determining unit 1140, configured to determine, in the square module array when the square module array is a square module array of m*m modules, a data information pattern corresponding to the m*m modules, m=17 or 18 or 19 or 20; and a data decoding unit 1150, configured to decode the data information pattern to obtain data;

each of the modules being a first-type module or a second-type module, and a color attribute of the first-type module being different from a color attribute of the second-type module.

In conclusion, according to the two-dimensional code identification apparatus provided in this example embodiment, when a square module array is a square module array of m*m modules, a data information pattern corresponding to the m*m modules is determined in the square module array, where m=17 or 18 or 19 or 20. Even if printed in a miniature area whose side length is 0.5 cm to 0.7 cm, the two-dimensional code may still be normally identified, and is suitable for being used in a small area application scenario such as an inner side of a bottle cap or a corner of an object.

Figure 12:
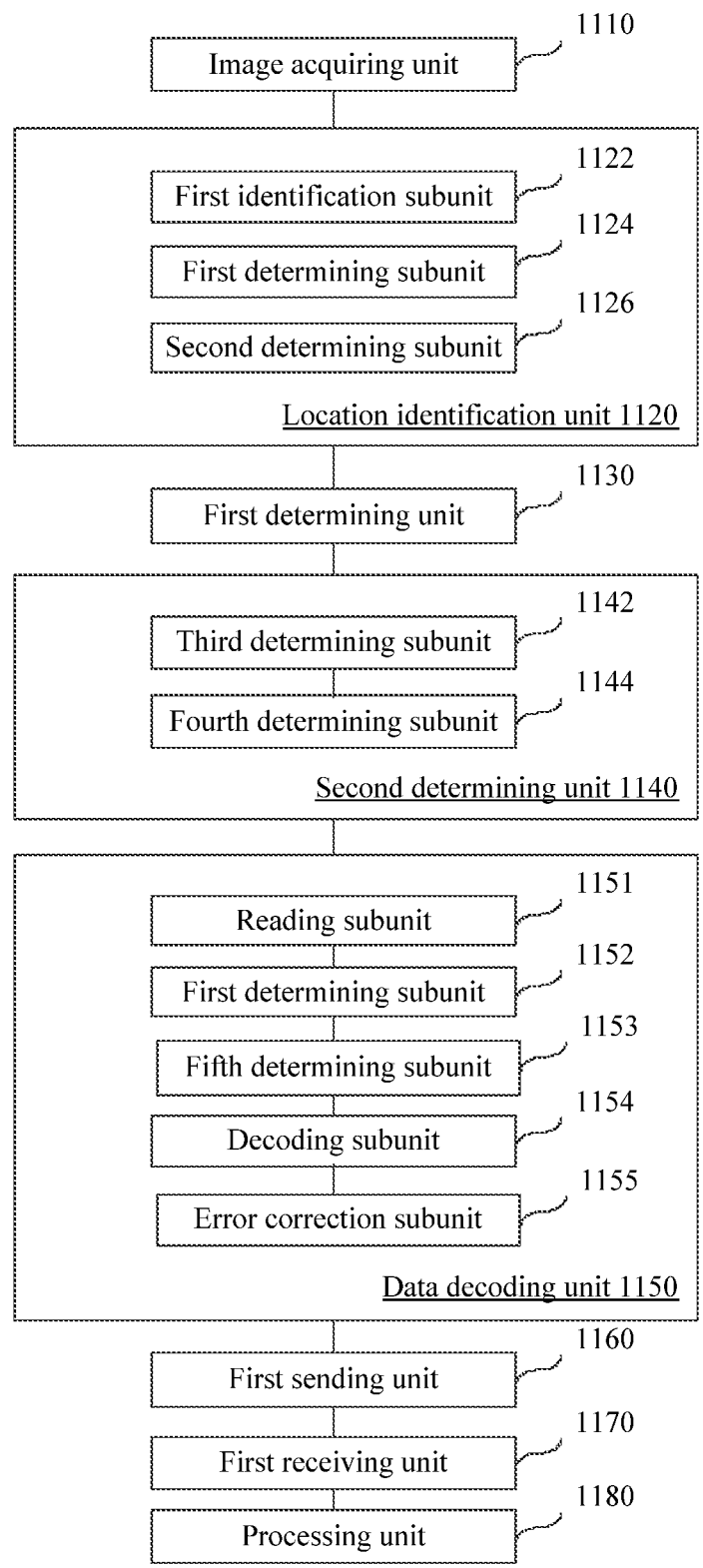
FIG. 12 is a schematic structural diagram of a two-dimensional code identification apparatus according to another example embodiment of the present disclosure.

FIG. 12 is a schematic structural diagram of a two-dimensional code identification apparatus according to another example embodiment of this application. The example method shown in FIG. 12 is based on the method shown in FIG. 11. The location identification unit 1120 includes:

a first identification subunit 1122, a first determining subunit 1124, and a second determining subunit 1126.

The first identification subunit 1122 is configured to identify n candidate location detection patterns from the two-dimensional code, where n≥3.

The first determining subunit 1124 is configured to determine, in the n candidate location detection patterns, a first location detection pattern, a second location detection pattern, and a third location detection pattern.

The second determining subunit 1126 is configured to determine a location of the two-dimensional code in the image by using the first location detection pattern as an upper left corner, the second location detection pattern as an upper right corner, and the third location detection pattern as a lower left corner.

The first determining subunit 1124 is configured to: sort the candidate location detection patterns in descending order of matching degrees between the candidate location detection patterns and a reference location detection pattern; and determine, in top three of the location detection patterns, the first location detection pattern, the second location detection pattern, and the third location detection pattern; or the first determining subunit 1124 is configured to: draw lines connecting centers of every three of the candidate location detection patterns to obtain corresponding triangles; determine, in the obtained triangles, a triangle having a highest similarity with an isosceles right triangle and whose longest side is the longest; and determine, in the three candidate location detection patterns corresponding to the determined triangle, the first location detection pattern, the second location detection pattern, and the third location detection pattern.

The second determining unit 1140 includes:
a third determining subunit 1142 and a fourth determining subunit 1144.

The third determining subunit 1142 is configured to determine, according to a distance between the first location detection pattern and the second location detection pattern, a width of the first location detection pattern, or a width of the second location detection pattern, whether the square module array is a square module array of m*m modules.

The fourth determining subunit 1144 is configured to determine, when the square module array is a square module array of m*m modules, a data information pattern according to encoding format information corresponding to the m*m modules.

The data decoding unit 1150 includes:
a reading subunit 1151, an acquiring subunit 1152, a fifth determining subunit 1153, a decoding subunit 1154, and an error correction subunit 1155.

The reading subunit 1151 is configured to read format information in the square module array.

The acquiring subunit 1152 is configured to acquire, from the format information, an error correction level corresponding to an error correction codeword, where the error correction level includes: an error correction level L, an error correction level I, an error correction level Q, and an error correction level H.

The fifth determining subunit 1153 is configured to determine, according to the error correction level, a first group of data blocks occupied by a data codeword in the data information pattern and a second of data blocks occupied by an error correction codeword in data information pattern.

The decoding subunit 1154 is configured to: decode the first group of data blocks to obtain the data codeword, and decode the second group of data blocks to obtain the error correction codeword.

The error correction subunit 1155 is configured to perform error correction on the data by using the error correction codeword.

The square module array further includes:
a location detection pattern separator, used for separating the location detection pattern and format information, or separating the location detection pattern and the data information pattern, where
the location detection pattern separator exists in i modules occupied by the square module array, and at least one of the i modules is the first-type module; and
the format information is used for indicating format information of the data during encoding.

The apparatus further includes: a first sending unit 1160 and a first receiving unit 1170.

The first sending unit 1160 is configured to send the first data information to a server.

The first receiving unit 1170 is configured to receive second data information fed back by the server, the second data information being found by the server from a preset correspondence, and a first byte length of the first data information being less than a second byte length of the second data information.

The second data information includes at least one of: a uniform resource locator URL, image information, audio information, text information, video information, and a prize drawing result.

In some implementations, the first data information is obtained by performing hash computation on the second data information.

In some implementations, the first data information is from a first data information repository and allocated to the second data information, where the first data information repository includes unused first data information.

The apparatus further includes:
a processing unit 1180, configured to perform one of the following steps: displaying, when the second data information is image information, content corresponding to the image information; or playing, when the second data information is audio information, content corresponding to the audio information; or displaying, when the second data information is text information, content corresponding to the text information; or playing, when the second data information is video information, content corresponding to the video information; or displaying, when the second data information is a prize drawing result, the prize drawing result.

In conclusion, according to the two-dimensional code identification apparatus provided in this example embodiment, when a square module array is a square module array of m*m modules, a data information pattern corresponding to the m*m modules is determined in the square module array, where m=17 or 18 or 19 or 20. Even if printed in a miniature area whose side length is 0.5 cm to 0.7 cm, the two-dimensional code may still be normally identified, and is suitable for being used in a small area application scenario such as an inner side of a bottle cap or a corner of an object.

Figure 13:
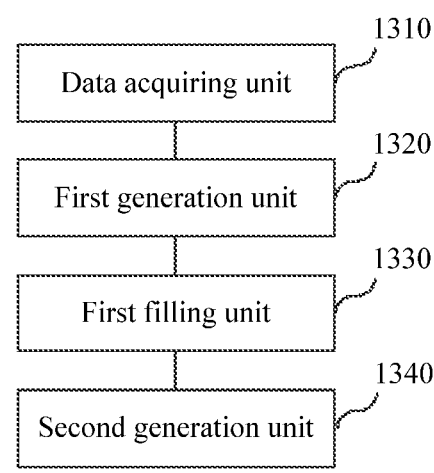
FIG. 13 is a schematic structural diagram of a two-dimensional code generation apparatus according to an example embodiment of the present disclosure.

FIG. 13 is a schematic structural diagram of a two-dimensional code generation apparatus according to an example embodiment. The apparatus includes:
a data acquiring unit 1310, configured to acquire to-be-encoded data;
a first generation unit 1320, configured to generate a data information pattern according to the to-be-encoded data;
a first filling unit 1330, configured to add the data information pattern and a location detection pattern to a square module array of m*m modules, m=17 or 18 or 19 or 20; and
a second generation unit 1340, configured to generate a two-dimensional code according to the square module array after the addition;
the location detection pattern being used for determining a location of the two-dimensional code, the data information pattern being used for carrying the data, each of the modules being a first-type module or a second-type module, and a color attribute of the first-type module being different from a color attribute of the second-type module.

In conclusion, according to the two-dimensional code generation apparatus provided in this example embodiment, a two-dimensional code is generated according to a square module array after addition. The square module array includes m*m modules. Even if printed in a miniature area whose side length is 0.5 cm to 0.7 cm, the generated two-dimensional code may still be normally identified, and is suitable for being used in a small area application scenario such as an inner side of a bottle cap or a corner of an object.

Figure 14:
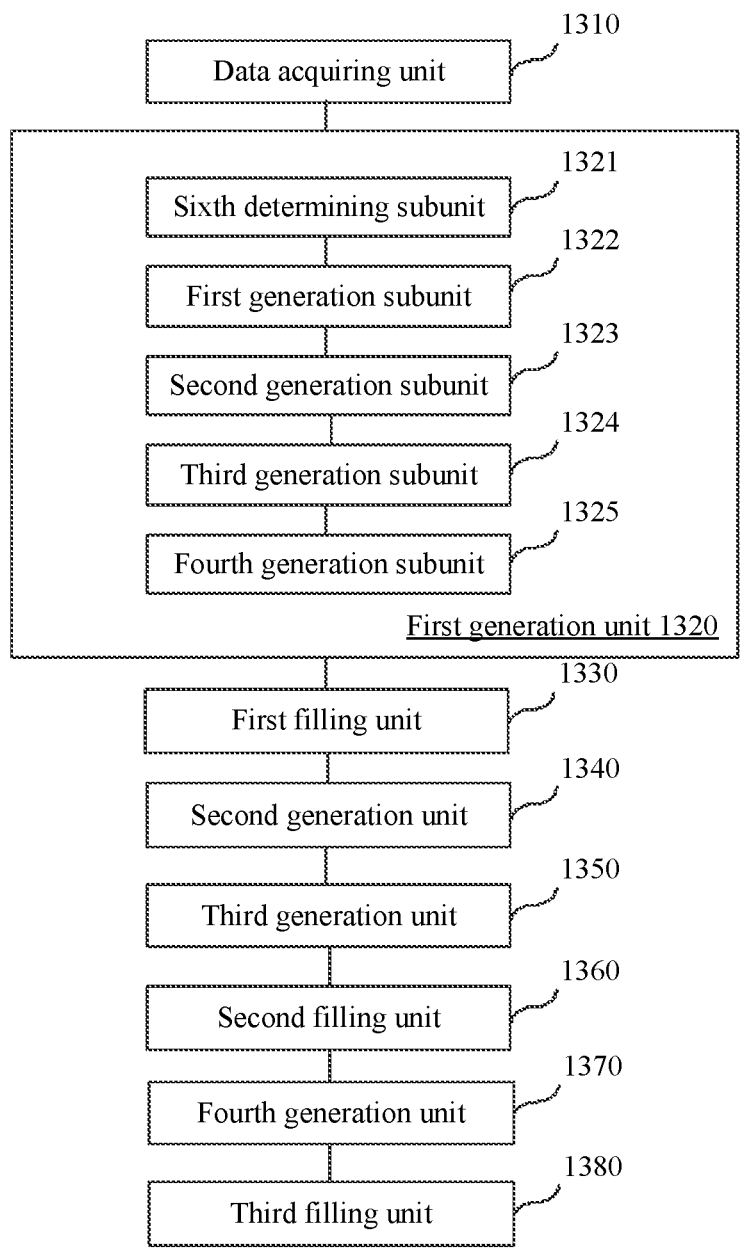
FIG. 14 is a schematic structural diagram of a two-dimensional code generation apparatus according to another example embodiment of the present disclosure.

FIG. 14 is a schematic structural diagram of a two-dimensional code generation apparatus according to another example embodiment. In some implementations, the example embodiment in FIG. 14 may be based on the example embodiment shown in FIG. 13. The first generation unit 1320 includes:
a sixth determining subunit 1321, a first generation subunit 1322, a second generation subunit 1323, a third generation subunit 1324, and a fourth generation subunit 1325.

The sixth determining subunit 1321 is configured to determine an error correction level, where the error correction level includes: an error correction level L, an error correction level I, an error correction level Q, and an error correction level H.

The first generation subunit 1322 is configured to generate a first group of data blocks by using the data according to the error correction level.

The second generation subunit 1323 is configured to generate, according to the generated first group of data blocks, an error correction codeword corresponding to the first group of data blocks.

The third generation subunit 1324 is configured to generate a second group of data blocks according to the error correction codeword.

The fourth generation subunit 1325 is configured to generate a data information pattern according to the first group of data blocks and the second group of data blocks, where the data information pattern includes 16 data blocks.

The generation apparatus further includes:

a third generation unit 1350 and a second filling unit 1360.

The third generation unit 1350 is configured to generate format information according to the error correction level.

The second filling unit 1360 is configured to add the format information to the square module array.

The generation apparatus further includes:

a fourth generation unit 1370 and a third filling unit 1380.

The fourth generation unit 1370 is configured to generate a location detection pattern separator, where the location detection pattern separator is used for separating the location detection pattern and the format information, or separating the location detection pattern and the data information pattern.

The third filling unit 1380 is configured to add the location detection pattern separator to the square module array.

The location detection pattern separator exists in i modules occupied by the square module array, and at least one of the i modules is the first-type module. The format information is used for indicating format information of the data during encoding.

In conclusion, according to the two-dimensional code generation apparatus provided in this example embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

In this example embodiment, a location detection pattern separator exists in i modules occupied by the square module array, and at least one of the i modules is a first-type module. This reduces a quantity of light-colored modules, and improves two-dimensional code printing and production efficiency while normal identification of the two-dimensional code is not affected.

In this example embodiment, a terminal further draws lines connecting centers of every three candidate location detection patterns to obtain corresponding triangles; determines a triangle having a highest similarity with an isosceles right triangle and whose longest side is the longest; and determines, in the three candidate location detection patterns corresponding to the determined triangle, a first location detection pattern, a second location detection pattern, and a third location detection pattern. In this way, the feature of forming an isosceles right triangle by using three location detection patterns is fully utilized, to accurately determine three location detection patterns from multiple groups of location detection patterns, thereby improving two-dimensional code identification accuracy.

Figure 15:
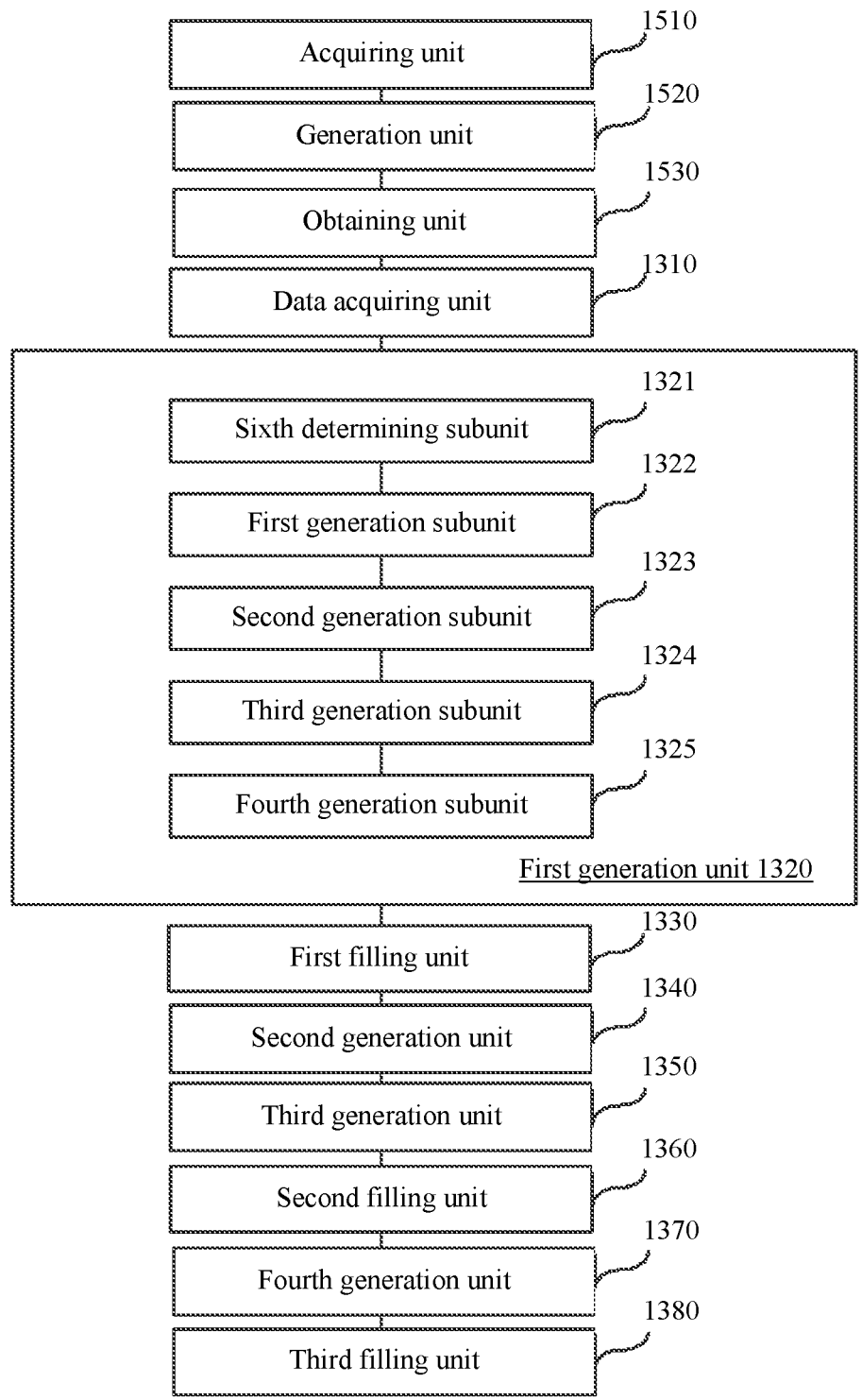
FIG. 15 is a schematic structural diagram of a two-dimensional code generation apparatus according to still another example embodiment of the present disclosure.

FIG. 15 is a schematic structural diagram of a two-dimensional code generation apparatus according to still another embodiment of this disclosure. In some implementations, the example embodiment shown in FIG. 15 may be based on the example embodiment shown in FIG. 13. The generation apparatus further includes:

an acquiring unit 1510, a generation unit 1520, and an obtaining unit 1530.

The acquiring unit 1510 is configured to acquire second data information.

The generation unit 1520 is configured to generate first data information corresponding to the second data information, a first byte length of the first data information being less than a second byte length of the second data information.

The obtaining unit 1530 is configured to obtain a preset correspondence according to the first data information and the second data information, the preset correspondence including a correspondence between the first data information and the second data information.

The data is first data information. The second data information includes at least one of: a uniform resource locator URL, image information, audio information, text information, video information, and a prize drawing result.

In conclusion, according to the two-dimensional code generation apparatus provided in this embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

In some embodiments, a location detection pattern separator exists in i modules occupied by the square module array, and at least one of the i modules is a first-type module. This reduces a quantity of light-colored modules, and improves two-dimensional code printing and production efficiency while normal identification of the two-dimensional code is not affected.

In some embodiments, first data information corresponding to second data information is further generated, and a first byte length of the first data information is less than a second byte length of the second data information. In this case, even if the second byte length of the second data information is very long, the two-dimensional code may still be generated. The two-dimensional code has a much smaller area than a regular two-dimensional code, but has a use range that is not obviously different from that of the regular two-dimensional code.

Figure 16:
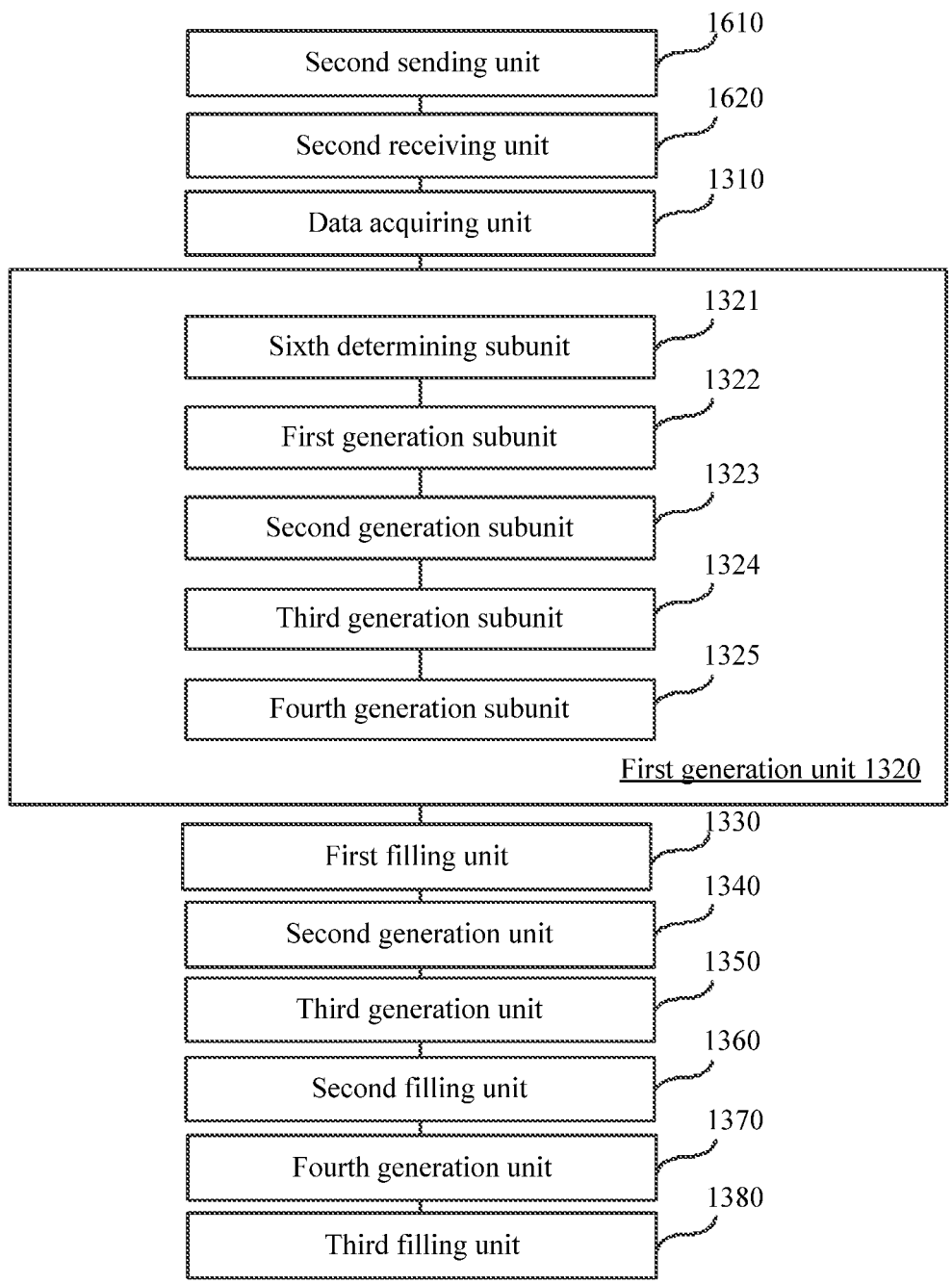
FIG. 16 is a schematic structural diagram of a two-dimensional code generation apparatus according to yet another example embodiment of the present disclosure.

FIG. 16 is a schematic structural diagram of a two-dimensional code generation apparatus according to yet another example embodiment. In some implementations, the example embodiment shown in FIG. 16 may be based on the example embodiment shown in FIG. 13. The generation apparatus further includes:

a second sending unit 1610 and a second receiving unit 1620.

The second sending unit 1610 is configured to send the second data information to a server.

The second receiving unit 1620 is configured to receive the first data information fed back by the server, a first byte length of the first data information being less than a second byte length of the second data information.

The data is first data information. The second data information includes at least one of: a uniform resource locator URL, image information, audio information, text information, video information, and a prize drawing result.

In some implementations, the first data information is obtained by performing hash computation on the second data information.

In some implementations, the first data information is from a first data information repository and allocated to the second data information, where the first data information repository includes unused first data information.

In conclusion, according to the two-dimensional code generation apparatus provided in this embodiment, a two-dimensional code is generated according to a square module array after addition. The square module array includes m*m modules, where m=17 or 18 or 19 or 20. Even if printed in a miniature area whose side length is 0.5 cm to 0.7 cm, the generated two-dimensional code may still be normally identified, and is suitable for being used in a small area application scenario such as an inner side of a bottle cap or a corner of an object.

In some embodiments, a location detection pattern separator exists in i modules occupied by the square module array, and at least one of the i modules is a first-type module. This reduces a quantity of light-colored modules, and improves two-dimensional code printing and production efficiency while normal identification of the two-dimensional code is not affected.

In some embodiments, first data information corresponding to second data information is further generated, and a first byte length of the first data information is less than a second byte length of the second data information. In this way, even if the second byte length of the second data information is very long, the two-dimensional code may still be generated. The two-dimensional code has a much smaller area than a regular two-dimensional code, but has a use range that is not obviously different from that of the regular two-dimensional code.

Figure 17:
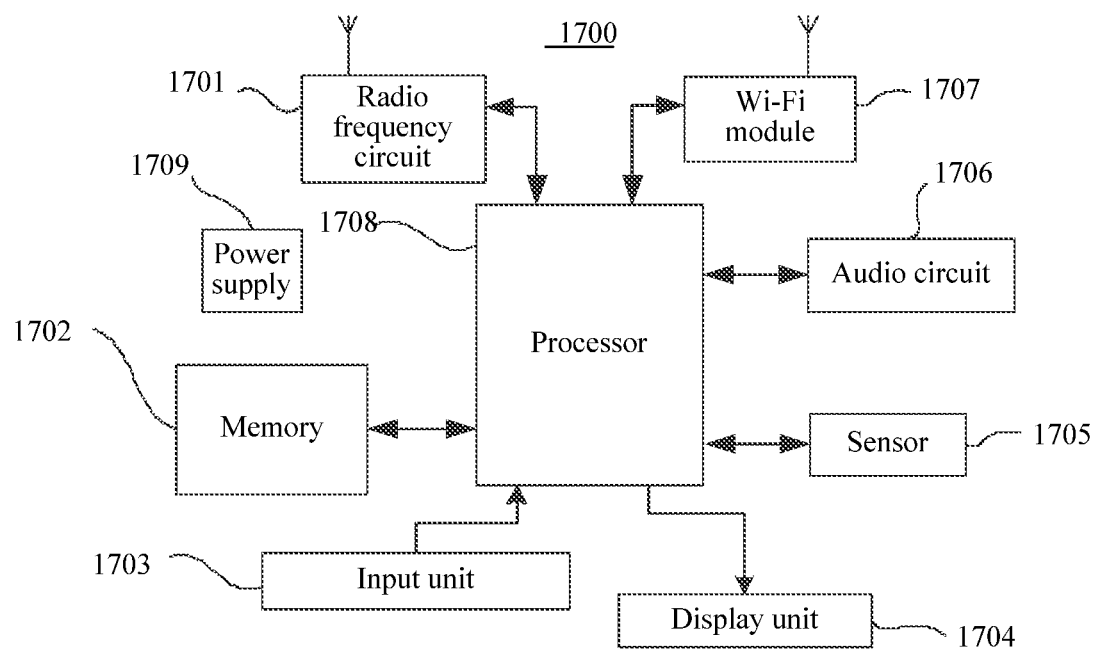
FIG. 17 is a structural block diagram of a terminal according to an example embodiment of the present disclosure.

FIG. 17 is a block diagram of a terminal 1700 according to an example embodiment. The terminal 1700 may include components such as a radio frequency (RF) circuit 1701, a memory 1702 that includes one or more computer-readable storage media, an input unit 1703, a display unit 1704, a sensor 1705, an audio circuit 1706, a Wireless Fidelity (Wi-Fi) module 1707, a processor 1708 that includes one or more central processing units, and a power supply 1709. A person skilled in the art will understand that the structure of the terminal shown in FIG. 17 does not constitute a limitation to the terminal, and the terminal 1700 may include more components or fewer components than those shown in the figure, or some components may be combined, or a different component deployment may be used.

The RF circuit 1701 may be configured to receive and send signals during information receiving and sending or during a call. Particularly, the RF circuit 1701 receives downlink information from a base station, then delivers the downlink information to one or more processors 1708 for processing, and sends related uplink data to the base station. Generally, the RF circuit 1701 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 1701 may also communicate with a network and another device by means of wireless communication. The wireless communication may use any communications standard or protocol, which includes but is not limited to, Global System for Mobile Communications (GSM), general packet radio service (GPRS), Code Division Multiple Access (CDMA), Wideband Code Division Multiple Access (WCDMA), Long Term Evolution (LTE), email, short message service (SMS), and the like.

The memory 1702 may be configured to store a software program and module. The processor 1708 runs the software program and module stored in the memory 1702, to implement various functional applications and data processing. The memory 1702 may mainly include a program storage area and a data storage area. The program storage area may store an operating system, an application program required by at least one function (such as a sound playback function and an image display function), and the like. The data storage area may store data (such as audio data and an address book) generated according to use of the terminal, and the like. In addition, the memory 1702 may include a high speed random access memory, and may further include a non-volatile memory, such as at least one magnetic disk storage device, a flash memory, or other volatile solid-state storage devices. Correspondingly, the memory 1702 may further include a memory controller, to provide access of the processor 1708 and the input unit 1703 to the memory 1702.

The input unit 1703 may be configured to receive input digit or character information, and generate a keyboard, mouse, joystick, optical or track ball signal input related to the user setting and function control. Specifically, in a specific embodiment, the input unit 1703 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1708. Moreover, the touch controller may receive and execute a command sent from the processor 1708. In addition, the touch-sensitive surface may be implemented in multiple types, such as a resistive type, a capacitive type, an infrared type, and a surface acoustic wave type. In addition to the touch-sensitive surface, the input unit 1703 may further include another input device. Specifically, the another input device may include but is not limited to one or more of a physical keyboard, a function key (for example, a volume control key or a power on/off key), a trackball, a mouse, or a joystick.

The display unit 1704 may be configured to display information input by the user or information provided for the user and various graphic user interfaces of the mobile terminal, where the graphic user interfaces may include a figure, text, an icon, a video, and any combination thereof. The display unit 1704 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 1708 to determine a type of a touch event, and then the processor 1708 provides corresponding visual output on the display panel according to the type of the touch event. Although in FIG. 17, the touch-sensitive surface and the display panel are used as two separate parts to implement input and output functions, in some embodiments, the touch-sensitive surface and the display panel may be integrated to implement the input and output functions.

The terminal may further include at least one sensor 1705 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to an ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which may be configured in the terminal is not described herein again.

The audio circuit 1706, a speaker, and a microphone may provide audio interfaces between the user and the terminal. The audio circuit 1706 may convert received audio data into an electrical signal and transmit the electrical signal to the speaker. The speaker converts the electrical signal into a sound signal for output. On the other hand, the microphone 162 converts a collected sound signal into an electrical signal. The audio circuit 1706 receives the electrical signal and converts the electrical signal into audio data, and outputs the audio data to the processor 1708 for processing. Then, the processor 1708 sends the audio data to, for example, another terminal by using the RF circuit 1701, or outputs the audio data to the memory 1702 for further processing. The audio circuit 1706 may further include an earplug jack, to provide communication between a peripheral earphone and the terminal.

Wi-Fi belongs to a short distance wireless transmission technology. The terminal may help, by using the Wi-Fi module 1707, a user to receive and send an email, browse a web page, and access stream media, and the like, which provides wireless broadband Internet access for the user. Although FIG. 17 shows the Wi-Fi circuit 1707, it may be understood that the wireless communications unit is not a necessary component of the terminal 1100, and when required, the wireless communications unit may be omitted as long as the scope of the essence of the present disclosure is not changed.

The processor 1708 is a control center of the terminal, which is connected to various parts of the entire mobile phone by using various interfaces and lines, and by running or executing a software program and/or module stored in the memory 1702 and calling data stored in the memory 1702, to perform various functions of the terminal and process data, so as to perform overall monitoring on the mobile phone. Optionally, the processor 1708 may include one or more central processing units. Preferably, the processor 1708 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1708.

The terminal further includes the power supply 1709 (such as a battery) for supplying power to the components. Preferably, the power supply may be logically connected to the processor 1708 by using a power management system, thereby implementing functions such as charging, discharging, and power consumption management by using the power management system. The power supply 1709 may further include one or more of a direct current or alternating current power supply, a re-charging system, a power failure detection circuit, a power supply converter or inverter, a power supply state indicator, and any other components.

Although not shown in the figure, in some implementations, the terminal may further include a camera, a Bluetooth module, and the like, which are not described herein. Specifically, in this example embodiment, the processor 1708 in the terminal runs one or more program instructions stored in the memory 1702, to implement the identification and generation methods provided in the foregoing example method embodiments.

A person of ordinary skill in the art will understand that all or some of the steps in the identification method and generation method of the foregoing example embodiments may be implemented by a program instructing relevant hardware. The program may be stored in a computer-readable storage medium. The storage medium may include: a read-only memory (ROM), a random access memory (RAM), a magnetic disk, an optical disc, or the like.

Figure 18:
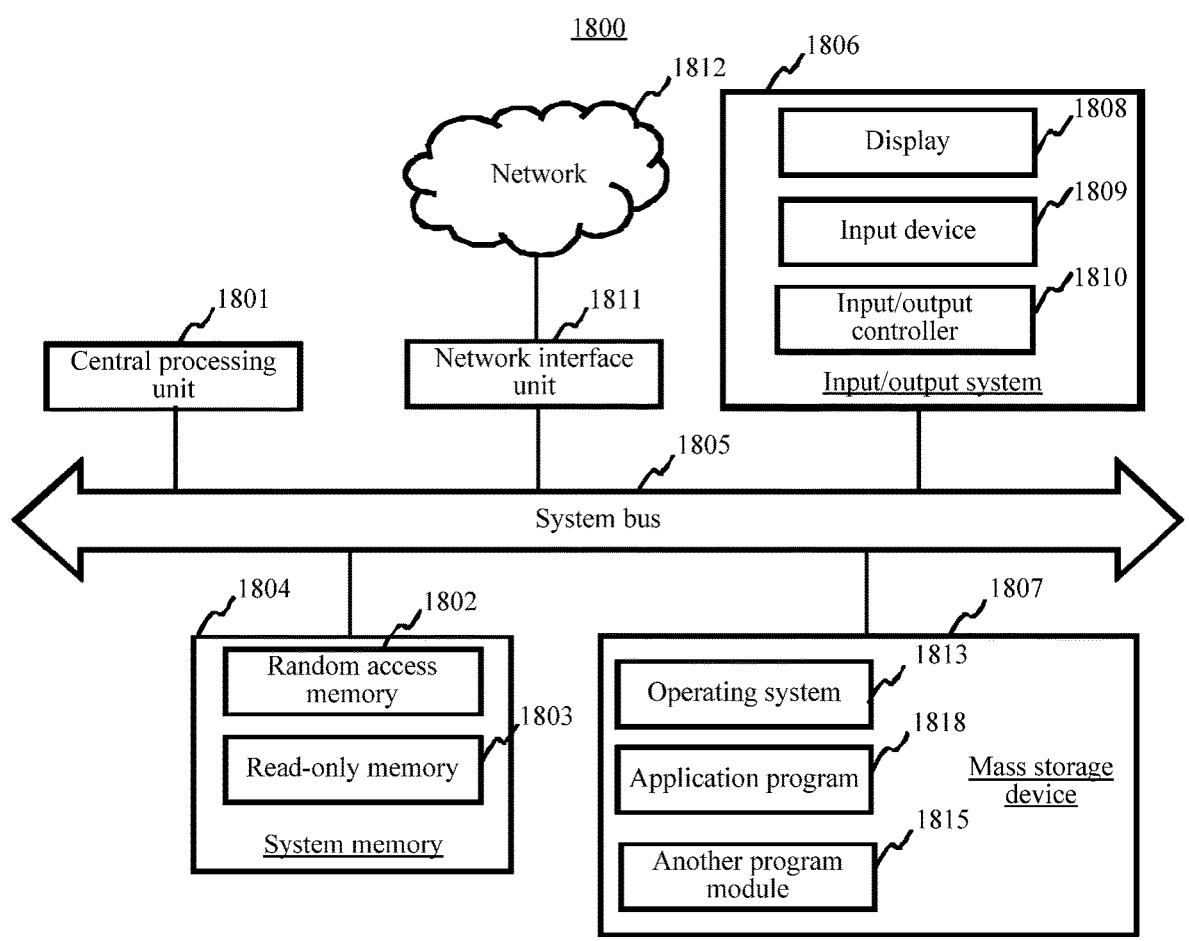
FIG. 18 is a schematic block diagram of a server according to an example embodiment of the present disclosure.

FIG. 18 is a structural diagram of a server according to an example. The server 1800 includes a central processing unit (CPU) 1801, a system memory 1804 including a RAM 1802 and a ROM 1803, and a system bus 1805 connecting the system memory 1804 and the CPU 1801. The server 1800 further includes a basic input/output system (I/O system) 1806 used for transmitting information between components in a computer, and a mass storage device 1807 used for storing an operating system 1813, an application program 1818, and another program module 1818.

The basic I/O system 1806 includes a display 1808 configured to display information, and an input device 1809 configured to input information by a user, such as a mouse and a keyboard. The display 1808 and the input device 1809 are both connected to the CPU 1801 by using an input/output controller 1810 connected to the system bus 1805. The basic I/O system 1806 may further include the input/output controller 1810, so as to receive and process input of multiple other devices, such as the keyboard, the mouse, or an electronic stylus. Similarly, the input/output controller 1810 further provides an output to a display screen, a printer or another type of output device.

The mass storage device 1807 is connected to the CPU 1801 by using a mass storage controller (not shown) connected to the system bus 1805. The mass storage device 1807 and an associated computer-readable medium provide non-volatile storage for the server 1800. That is, the mass storage device 1807 may include a computer-readable medium (not shown) such as a hard disk or a CD-ROM.

In general, the computer-readable medium may include a computer storage medium and a communications medium. The computer storage medium includes volatile and non-volatile media, and removable and non-removable media implemented by using any method or technology and used for storing information such as a computer-readable instruction, a data structure, a program module, or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person skilled in the art may know that the computer storage medium is not limited to the foregoing types. The system memory 1804 and the mass storage device 1807 may be collectively referred to as a memory.

According to the example embodiments of the present disclosure, the server 1800 may further be connected to a remote computer on a network through a network such as the Internet. That is, the server 1800 may be connected to a network 1812 by using a network interface unit 1811 connected to the system bus 1805, or may be connected to another type of network or a remote computer system (not shown) by using a network interface unit 1811.

In some implementations, the CPU 1801 in the server runs one or more program instructions stored in the memory 1804, to implement the identification and generation methods provided in the foregoing method embodiments.

The memory further includes one or more programs, where the one or more programs are stored in the memory, and the one or more programs include instructions used for performing the identification and generation methods provided in the embodiments of the present invention.

In addition, an example embodiment of this disclosure further provides a non-volatile storage medium, configured to store one or more computer programs, the computer program including an instruction that may be executed by a processor, and the instruction, when executed by a computer, causing the computer to perform the identification and generation methods provided in the previously described example method embodiments described above. The non-volatile storage medium may be located in the terminal or the server described above.

Figure 19:
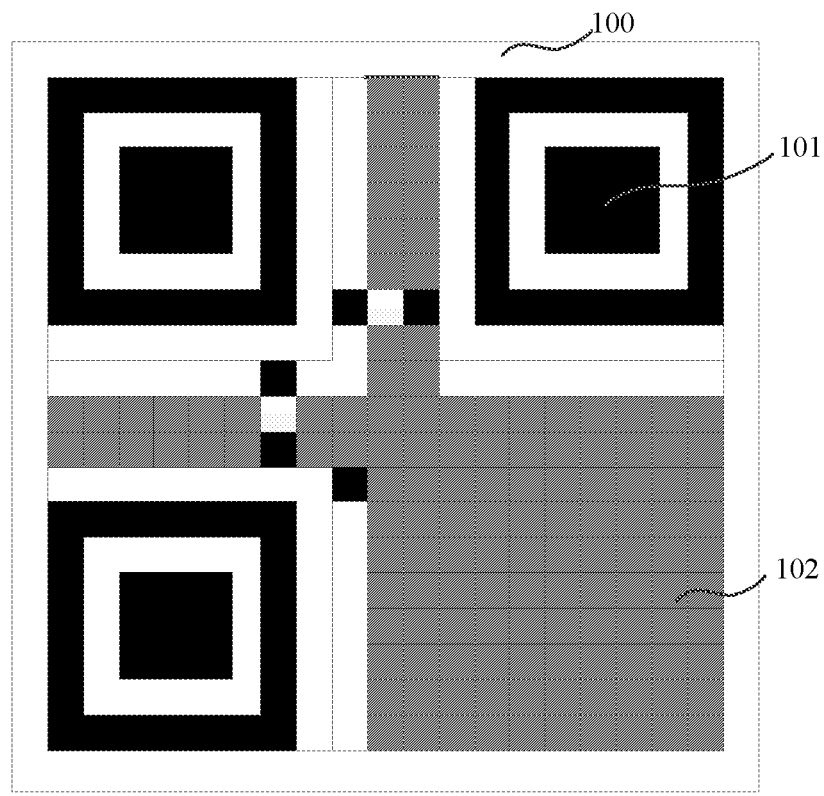
FIG. 19 is a schematic structural diagram of a two-dimensional code according to an example embodiment of the present disclosure.

FIG. 19 is a schematic structural diagram of a two-dimensional code according to an example embodiment of this disclosure. For details not elaborated in this example embodiment, reference may be made to the example embodiments of FIG. 1 to FIG. 3. The two-dimensional code 100 includes a square module array of m*m modules. The square module array includes a location detection pattern 101 and a data information pattern 102.

The location detection pattern 101 is used for determining a location of the two-dimensional code. The location detection pattern 101 may include three identical location detection patterns. The three location detection patterns are separately distributed on an upper left corner, an upper right corner, and a lower left corner of the two-dimensional code.

The data information pattern 102 is used for carrying data. The data information pattern 102 is a dashed area indicated by an oblique line box in FIG. 1.

Each of the modules is a first-type module or a second-type module, and a color attribute of the first-type module is different from a color attribute of the second-type module. A module is a minimal identification unit in a two-dimensional code. In some implementations, the module is a square.

In some implementations, the first-type module is a dark-colored module, indicating a binary number 1, and the second-type module is a light-colored module, indicating a binary number 0.

Generally, the color attribute of the first-type module is black, and the color attribute of the second-type module is white. A color attribute of a module is not limited in this embodiment. It should be noted that in a different embodiment, the square module array may further be referred to as a square array, a matrix array, a square matrix, or a square matrix array.

Figure 20:
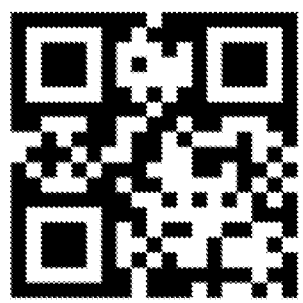
FIG. 20 shows a two-dimensional code pattern generated by using a square module array according to an example embodiment of the present disclosure.

FIG. 20 shows a two-dimensional code pattern generated by using a square module array according to an example embodiment of this disclosure.

In conclusion, according to a miniature two-dimensional code provided in this embodiment, the miniature two-dimensional code has a square module array of m*m modules. Even if printed in a miniature area whose side length is 0.5 cm to 0.7 cm, the two-dimensional code may still be normally identified, and is suitable for being used in a small area application scenario such as an inner side of a bottle cap or a corner of an object.

It should be noted that a specific type of the two-dimensional code is not limited by this example embodiment. In some embodiments, the miniature two-dimensional code may be disposed by means of ink-jet printing, pasting, laser printing, electronic display, or the like. The manner of disposing the object is not limited by this example embodiment.

The sequence numbers used in the description of the preceding example embodiments are merely for the purpose of describing these embodiments and do not indicate any preference of these example embodiments.

A person of ordinary skill in the art will understand that all or some of the steps in the identification method and generation method of the foregoing example embodiments may be implemented by using hardware, or may be implemented by a program instructing relevant hardware. The program may be stored in a computer-readable storage medium. The storage medium may be a read-only memory, a magnetic disk, an optical disc, or the like.

The foregoing descriptions are merely example embodiments according to certain aspects of the present disclosure, and are not intended to limit the present disclosure. Any modification, equivalent replacement, or improvement made within the spirit and principle of the present disclosure shall fall within the protection scope of the present disclosure and the appended claims.

What is claimed is:

1. A two-dimensional code comprising:
a square module array comprising:
an array of m*m modules, a location detection pattern and a data information pattern, wherein
the location detection pattern determines a location of the two-dimensional code, the data information pattern is configured to carry data information, each module of the array of m*m modules is at least one of a first-type module and a second-type module, a color attribute of the first-type module is different from a color attribute of the second-type module, and m is at least one of 17, 18, 19, and 20,
wherein the square module array further comprises:
a location detection pattern separator, configured to separate the location detection pattern and at least one of the format information and the data information pattern,
the location detection pattern separator exists in multiple modules occupied by the square module array,
at least one of the multiple modules is the first-type module, and
at least one of the multiple modules is the second-type module, and
the format information is used for indicating information about a format of the data during encoding.

2. The two-dimensional code according to claim 1, wherein the data information includes a first data information corresponding to a second data information, and a first byte length of the first data information is less than a second byte length of the second data information.

3. The two-dimensional code according to claim 1, wherein the data information pattern is configured to carry a data codeword, an error correction codeword corresponding to the data codeword, and 16 data blocks,
each of the 16 data blocks occupies eight modules in the square module array, and
at least one of the data blocks occupies eight adjacent modules in the square module array.

4. The two-dimensional code according to claim 1, wherein a side length of the two-dimensional code is 0.5 cm to 0.7 cm.

5. A method comprising:
acquiring an image that includes a two-dimensional code;
identifying, based on a location detection pattern of the two-dimensional code, a location of the two-dimensional code in the acquired image;
determining, based on the identified two-dimensional code, a square module array of the two-dimensional code;
determining a data information pattern corresponding to m*m modules of the square module array; and
obtaining data by decoding the data information pattern, wherein
each of the m*m modules is at least one of a first-type module and a second-type module, a color attribute of the first-type module is different from a color attribute of the second-type module, and m is at least one of 17, 18, 19 and 20,
wherein identifying the location of the two-dimensional code in the acquired image by using the location detection pattern comprises:
identifying n candidate location detection patterns from the two-dimensional code, wherein n≥3;
determining, in the n candidate location detection patterns, a first location detection pattern, a second location detection pattern, and a third location detection pattern; and
determining a location of the two-dimensional code in the image by using the first location detection pattern as an upper left corner, the second location detection pattern as an upper right corner, and the third location detection pattern as a lower left corner.

6. The method according to claim 5, wherein determining, in the n candidate location detection patterns, the first location detection pattern, the second location detection pattern, and the third location detection pattern comprises:
sorting the n candidate location detection patterns in descending order of matching degrees between the n candidate location detection patterns and a reference location detection pattern; and
at least one of
determining, from among the top three of the location detection patterns, the first location detection pattern, the second location detection pattern, and the third location detection pattern, and
connecting a center of every three of the n candidate location detection patterns to obtain corresponding triangles,
determining, in the obtained triangles, a triangle having a highest similarity with an isosceles right triangle and whose longest side is the longest, and
determining, in the three candidate location detection patterns corresponding to the determined triangle, the first location detection pattern, the second location detection pattern, and the third location detection pattern.

7. The method according to claim 5, wherein the obtained data is first data information, and the method further comprises:
receiving second data information, in response to transmitting the first data information, the second data information, wherein
the second data information is based on a preset correspondence, and
a first byte length of the first data information is less than a second byte length of the second data information.

8. The method according to claim 7, wherein
the first data information is obtained by performing hash computation on the second data information, or obtained from a first data information repository and allocated to the second data information, wherein the first data information repository comprises unused first data information.

9. The method according to claim 7, further comprising:
prior to receiving the second data information:
if the second data information is a URL, jumping to a web page corresponds to the URL;
if the second data information is image information, displaying content corresponding to the image information;
if the second data information is audio information, playing content corresponding to the audio information;
if the second data information is text information, displaying content corresponding to the text information;
if the second data information is video information, playing content corresponding to the video information;
if the second data information is a prize drawing result, displaying the prize drawing result.

10. The method according to claim 5, wherein the square module array further comprises:
a location detection pattern separator configured to separate the location detection pattern from at least one of the format information and the data information pattern, wherein
the location detection pattern separator exists in multiple modules occupied by the square module array, at least one of the multiple modules is the first-type module, and at least one of the multiple modules is the second-type module, and
the format information indicates format information of the data during encoding.

11. The method according to claim 5, wherein a side length of the two-dimensional code is 0.5 cm to 0.7 cm.

12. An apparatus, the apparatus comprising:
at least one memory configured to store computer program code; and
at least one processor configured to access said at least one memory and operate according to said computer program code, said computer program code including:
image acquiring code, configured to cause the at least one processor to acquire an image comprising a two-dimensional code;
location identification code, configured to cause the at least one processor to identify a location of the two-dimensional code in the image by using the location detection pattern;

first determining code, configured to cause the at least one processor to determine, according to the location, a square module array corresponding to the two-dimensional code;

second determining code, configured to cause the at least one processor to determine, in the square module array when the square module array is a square module array of m*m modules, a data information pattern corresponding to the m*m modules; and data decoding code, configured to cause the at least one processor to decode the data information pattern to obtain data, wherein each of the modules is a first-type module or a second-type module, a color attribute of the first-type module is different from a color attribute of the second-type module, and m is equal to at least one of 17, 18, 19 and 20, wherein the location identification code includes:
first identification code, first determining code, and a second determining code, wherein
the first identification code is configured to cause the at least one processor to identify n candidate location detection patterns from the two-dimensional code, wherein n≥3,
the first determining code is configured to cause the at least one processor to determine, in the n candidate location detection patterns, a first location detection pattern, a second location detection pattern, and a third location detection pattern, and
the second determining code is configured to cause the at least one processor to determine a location of the two-dimensional code in the image by using the first location detection pattern as an upper left corner, the second location detection pattern as an upper right corner, and the third location detection pattern as a lower left corner.

13. The apparatus according to claim 12, wherein the first determining code is further configured to cause the at least one processor to
at least one of:
sort the candidate location detection patterns in descending order of matching degrees between the candidate location detection patterns and a reference location detection pattern; and determine, in top three of the location detection patterns, the first location detection pattern, the second location detection pattern, and the third location detection pattern, and draw lines connecting centers of every three of the candidate location detection patterns to obtain corresponding triangles;

determine, in the obtained triangles, a triangle having a highest similarity with an isosceles right triangle and whose longest side is the longest; and determine, in the three candidate location detection patterns corresponding to the determined triangle, the first location detection pattern, the second location detection pattern, and the third location detection pattern.

14. The apparatus according to claim 12, wherein the data is first data information; and the program code further includes:

first sending code configured to cause the at least one processor to transmit the first data information; and first receiving code configured to cause the at least one processor to receive second data information, wherein the second data information is based on a preset correspondence, and a first byte length of the first data information is less than a second byte length of the second data information.

15. The apparatus according to claim 14, wherein the first data information is obtained by performing hash computation on the second data information or the first data information is obtained from a first data information repository and allocated to the second data information, and the first data information repository comprises unused first data information.

16. The apparatus according to claim 14, wherein the program code further includes:

processing code configured to cause the at least one processor to at least one of:
jump, when the second data information is a URL, to a web page corresponding to the URL;
display, when the second data information is image information, content corresponding to the image information;
play, when the second data information is audio information, content corresponding to the audio information;
display, when the second data information is text information, content corresponding to the text information;
play, when the second data information is video information, content corresponding to the video information; and
display, when the second data information is a prize drawing result, the prize drawing result.

17. The apparatus according to claim 12, wherein the square module array comprises:
a location detection pattern separator configured to separate the location detection pattern and at least one of a format information and the data information pattern, wherein
the location detection pattern separator exists in multiple modules occupied by the square module array, at least one of the multiple modules is the first-type module, and at least one of the modules is the second-type module, and
the format information indicates format information of the data during encoding.

* * * * *